United States Patent [19]
Ishifuji et al.

[11] Patent Number: 6,084,905
[45] Date of Patent: Jul. 4, 2000

[54] FREQUENCY HOPPED WIRELESS COMMUNICATION SYSTEM AND COMMUNICATION EQUIPMENT USING A PREAMBLE FIELD AND INFORMATION TRANSFER FIELD SUCCEEDING THE PREAMBLE FIELD

[75] Inventors: Tomoaki Ishifuji, Tokyo; Gen'ichi Ishii, Hachioji; Shuichi Adachi, Hadano, all of Japan

[73] Assignee: Hitachi, Ltd., Tokyo, Japan

[21] Appl. No.: 08/636,388

[22] Filed: Apr. 22, 1996

[30]  Foreign Application Priority Data

Apr. 27, 1995 [JP] Japan .................................... 7-103438

[51] Int. Cl.[7] ........................................................ H04K 1/04

[52] U.S. Cl. ........................................... 375/202; 375/200

[58] Field of Search ..................................... 375/200, 202, 375/286, 345, 287; 330/129, 279; 455/240.1, 241.1, 239.1

[56]  References Cited

U.S. PATENT DOCUMENTS

| | | | |
|---|---|---|---|
| 5,029,182 | 7/1991 | Cal et al. | 375/1 |
| 5,319,801 | 6/1994 | Richey et al. | 455/79 |
| 5,450,035 | 9/1995 | Kinoshita | 330/129 |
| 5,537,414 | 7/1996 | Takiyasu et al. | 370/347 |

*Primary Examiner*—William Luther
*Attorney, Agent, or Firm*—Antonelli, Terry, Stout & Kraus, LLP

[57]  ABSTRACT

Communication equipment in a slow frequency hopped communication system employing a multi-level quadrature modulation carries out the AGC operation of a receiver amplifier and the operation of synchronizing the received frequency with a carrier frequency during reception of a first field of a preamble field of a communication frame when the carrier is unmodulated, completes the timing recovery of a received symbol and the synchronization with the timing during reception of a second field of the preamble field of the communication frame when the phase of the carrier is changed every symbol time, and thereafter, modulates an information signal in an information transfer field subsequent to the preamble field of the communication frame.

14 Claims, 14 Drawing Sheets

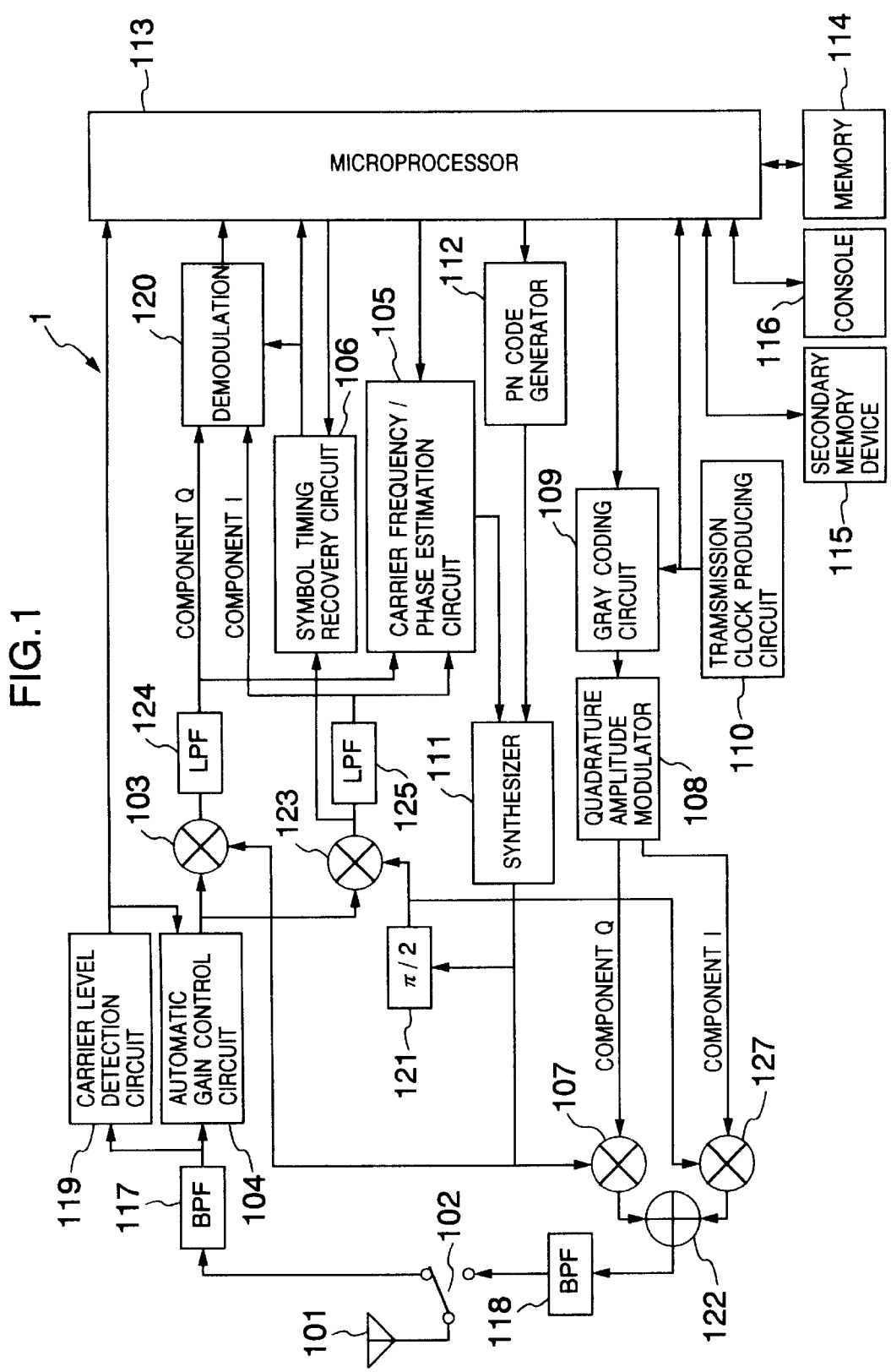

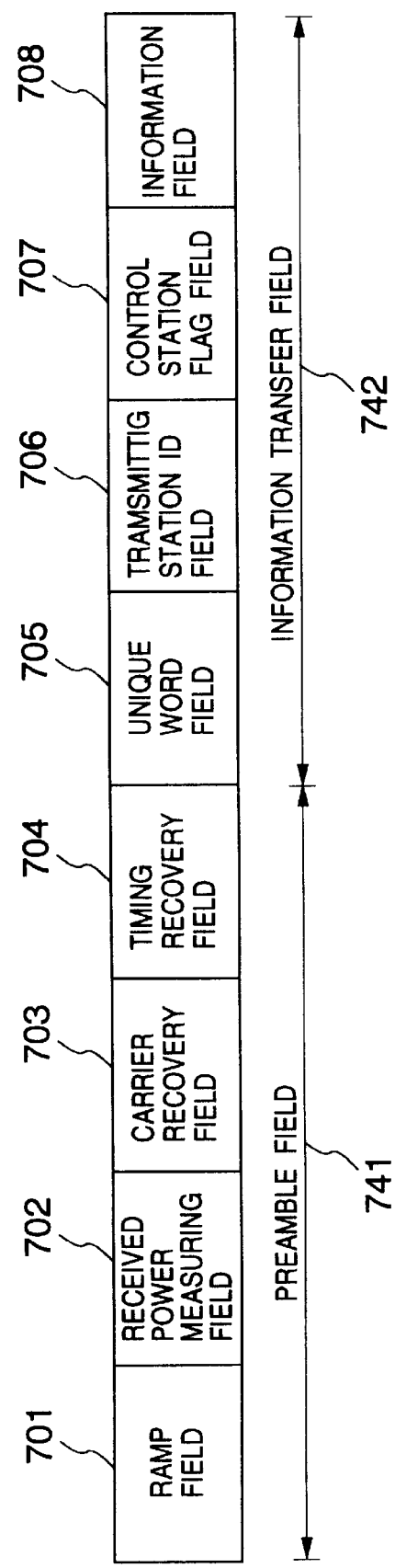

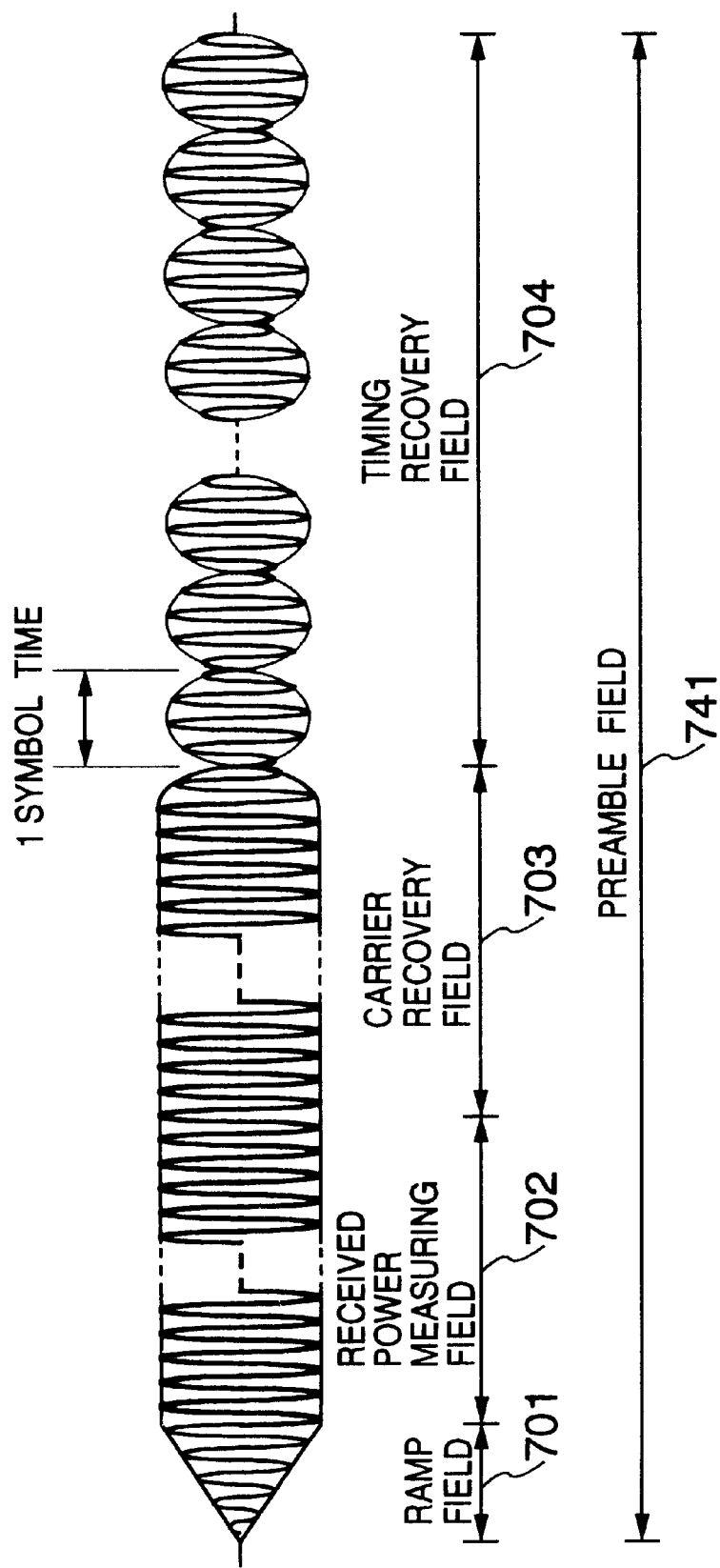

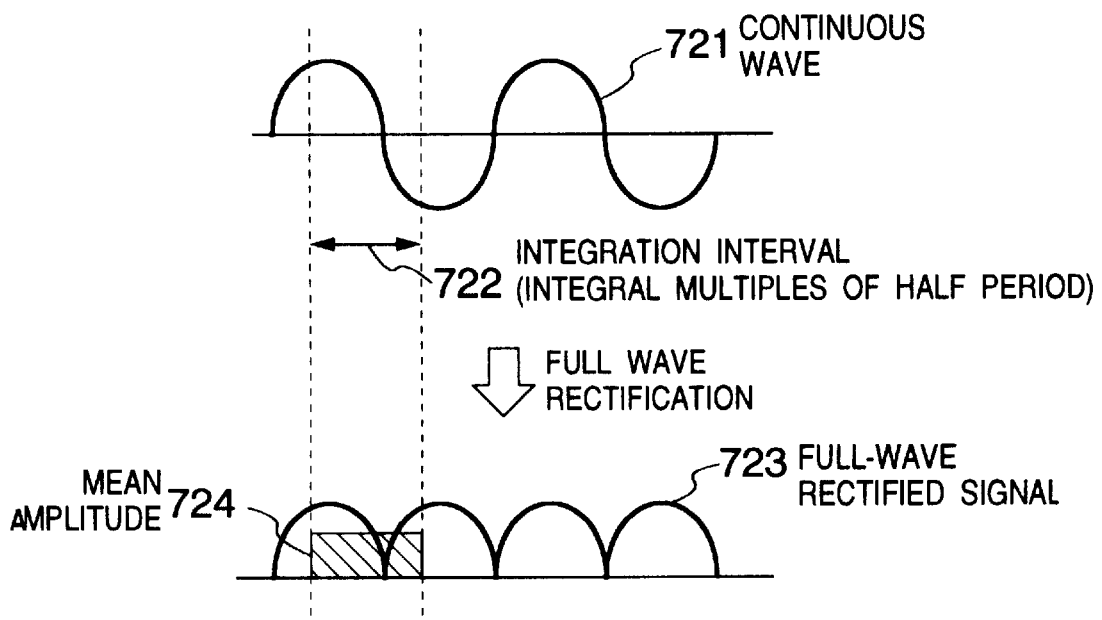
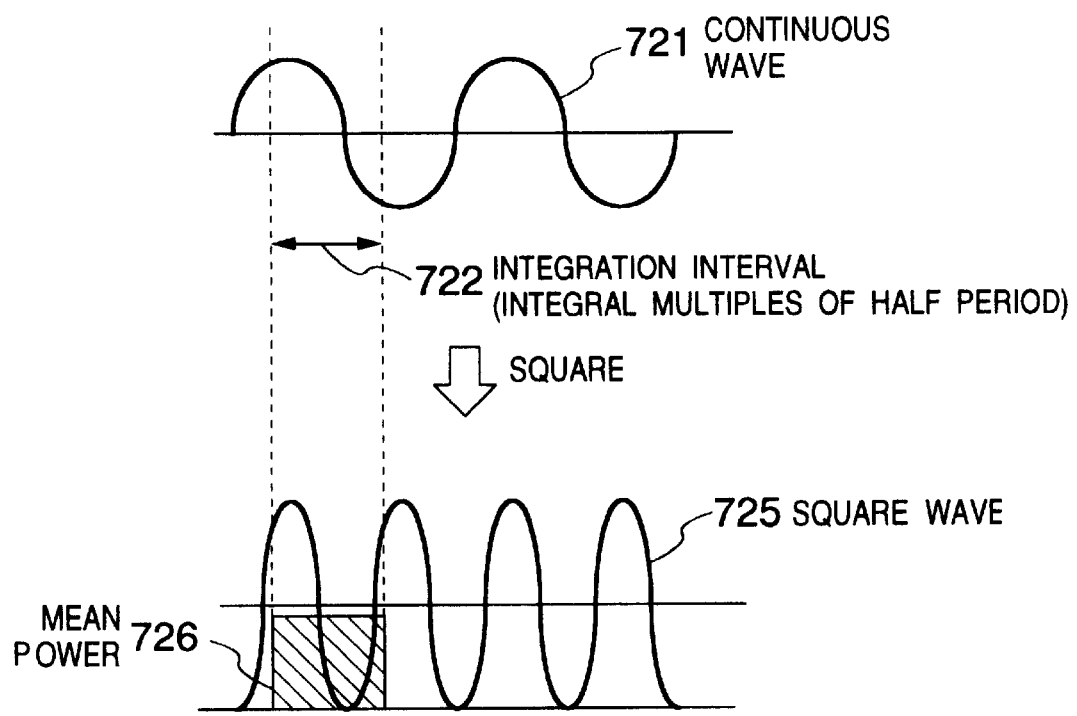

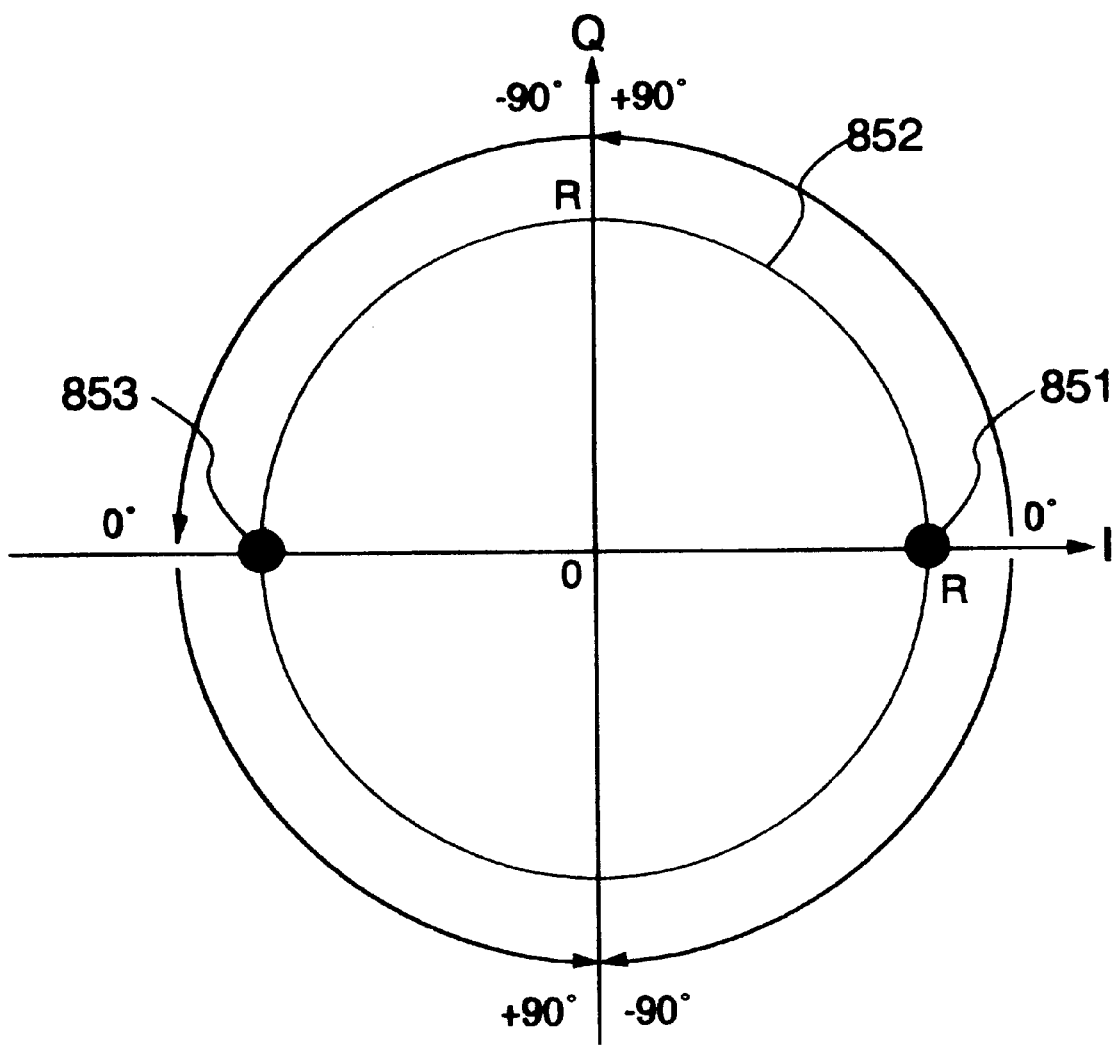

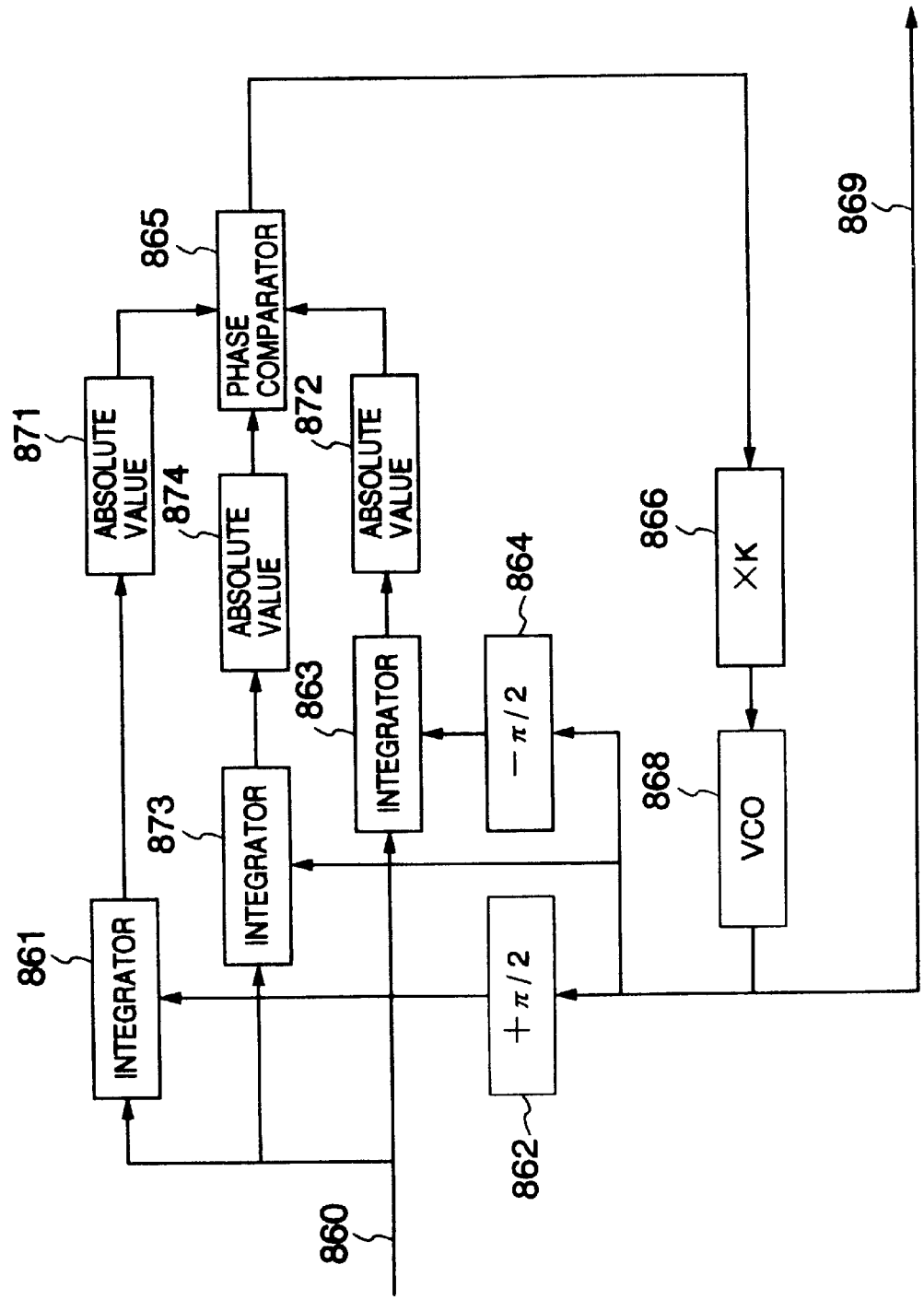

FREQUENCY HOPPED WIRELESS COMMUNICATION SYSTEM AND COMMUNICATION EQUIPMENT USING A PREAMBLE FIELD AND INFORMATION TRANSFER FIELD SUCCEEDING THE PREAMBLE FIELD

BACKGROUND OF THE INVENTION

The present invention relates in general to a wireless communication system and communication equipment, and more particularly to a relatively slow frequency hopped wireless communication system and communication equipment in which a plurality of communication equipment hops the frequency at a timing synchronous with a communication frame produced by a control station.

In the wireless mobile communication system, it is necessary to carry out the high quality communication through a unstable radio channel. As one technology for improving the transmission quality of performance in the unstable radio channel, there is well known a spread spectrum.

The spread spectrum includes two methods of "a direct sequence" and "a frequency hopping". Out of them, the frequency hopping has (1) the advantage that it can sufficiently cope with the distance problems, (2) the advantage that the frequency diversity can be readily constructed, and so forth, and therefore, in particular, the application of the spread spectrum to the land communication is expected. Incidentally, such a spread spectrum is explained in an article of "Spread Spectrum Communication System" by Mitsuo Yokoyama, Scientific Technology Publishing Company, 1988 for example. The frequency hopping is described in detail in the above-mentioned article, pp.563 to 611.

In general, the wireless channel is poor in the transmission quality of performance as compared with the wired channel, and hence has a tendency that the errors occur burstly. Therefore, even if the random error correction code such as a BCH code which can be relatively readily put to practical use is simply applied to the wireless communication system, it is difficult to realize the effective error control. Then, if the frequency hopping is employed which has the frequency diversity effect in principle and also the error correction code such as the BCH code is used together therewith, it is expected that the measures for preventing effectively the burst error can be realized. However, in order to obtain the frequency diversity effect in the frequency hopping, the hopping interval needs to be made shorter than the length of the allowable burst error.

For the above-mentioned reasons, for the conventional frequency hopping, there is employed a fast frequency hopping in which a plurality of hoppings are carried out within one symbol time period, or a slow frequency hopping in which the hopping is carried out about one time within several symbol time periods. In any case, as for the conventional frequency hopping, there is employed in many cases the hopping method having the short hopping interval in which the duration of one carrier frequency is within several times as long as the symbol period. However, in those conventional frequency hoppings, when carrying out the high speed transmission, the relatively expensive frequency synthesizer which can switch the frequency at a high speed becomes the essential factor.

With those points as background, while having a suspicion that the frequency diversity effect is reduced since the hopping interval is increased up to about several tens to 100 msec, the slow frequency hopping by which the relatively inexpensive synthesizer can be applied has been put to practical use. That is, the slow frequency hopping has been made by paying attention to the characteristics of the indoor wireless channel in which even if the fading period is relatively long (about several tens msec or more) and the hopping interval is long, a certain degree of frequency diversity effect can be obtained. Then, the slow frequency hopping is applied to the wireless LAN system pointing to the indoor communication.

However, even in the slow frequency hopped communication system in which the hopping interval is relatively increased in such a way, both the electric power of the received signal and the phase of the carrier are unstable before and after the switching of the frequency, and hence the continuity thereof is not ensured. As a result, it is difficult to make the frame length equal to or longer than the hopping period. Therefore, as for the communication form, the slow frequency hopping is applied in general to the communication of a burst mode in which the transmission and reception of the data are repeatedly carried out in units of frame.

In this case, since the influence of the over head portion of the preamble or the like upon the frame efficiency is large, as for the modulation method, there is employed in general the modulation method in which the preamble length of the communication frame has only to be short, e.g., the frequency modulation method, as the constant envelope modulation, in which the coherent detection is unnecessary.

If the multi-level quadrature amplitude modulation (hereinafter, referred to as "a QAM" for short, when applicable) in which the frequency efficiency is high and the high speed transmission is possible is intended to be applied as the modulation method, an automatic gain control (hereinafter, referred to as "an AGC" for short, when applicable) circuit needs to be provided in order to fetch effectively the amplitude component of the modulated signal. In addition, a circuit for recovering a carrier becomes essential in order to carry out the coherent detection. In order to recover the carrier, the field which is used to measure the electric power of the received signal and to recover the carrier needs to be prepared in the preamble field of each communication frame, and hence it is accompanied by the increasing of the preamble length.

In general, in the communication system of the slow frequency hopping, it is difficult to make the frame length equal to or longer than the hopping period, and hence that system is suitable for the burst communication rather than the continuous communication. In addition, the head portion of the communication frame used in the burst communication has the preamble field provided thereat, and each receiving unit carries out the specific adjustment and the synchronous work for the various circuits which are required for the signal modulation of the data field subsequent to the preamble field, such as the gain control of the receiver, the recovery of the carrier and the timing recovery, on the basis of the received information from the preamble field. The length of the preamble field is independent of the modulation method itself of the signal in the data field.

On the other hand, as for the modulation method for carrying out the high speed communication with the limited frequency band, the multi-level modulation is effective. According to the multi-level modulation, since the number of bits which can be transmitted within a unit time period is increased, the frame length (time) can be shortened as compared with other modulation methods if the number of bits constituting the communication frame is the same as that of other modulation methods. However, if the multi-level modulation is employed, there arises a problem that the characteristics of the signal to noise ratio v.s. the bit error rate are degraded and also the interference resistance against the multipass and the noise source is reduced. In addition, if the frame length is increased, in general, the frame error rate is necessarily increased. Therefore, even if the multi-level modulation is employed, it is difficult to increase largely the number of bits of the frame while maintaining the frame error rate constant. Accordingly, the communication needs to be carried out with the short frame divided into small pieces.

For the reasons described above, by employing the multi-level modulation for the information transfer, the information transfer field in the frame is decreased, but the preamble which is independent of the modulation method is not decreased. Therefore, the ratio of the information transfer field included in the frame length is low, and hence the frame efficiency is not improved. As a result, even if the multi-level modulation is used in the slow frequency hopped communication system, the superiority of the frequency efficiency thereof can not be sufficiently utilized.

As for the typical example of the multi-level modulation, with respect to the 16QAM for example, an article of IEICE (The Institute of Electronics, Information and Communication Engineers) Technical Report entitled "Performance of 16QAM MODEM for the Digital Land Mobile Communication System", RCS88-62, January, 1989 reports that when the time constant of the AGC is made equal to or less than 10 msec at the transmission rate of 16 k symbol/sec, even the variation in the amplitude due to the modulation is compensated. For this reason, the time constant of the AGC needs to be set to a value equal to or larger than 160 symbols.

In the conventional AGC, the method of converging the level of the signal to the optimal signal level using the closed loop is employed. Therefore, in order to carry out the AGC operation, the preamble length needs to be set to a value which is much longer than 160 symbols as described above, e.g., a value in the range of about several hundreds to 1,000 symbols.

On the other hand, we consider the maximum frame length of the communication frame used in the typical burst communication. For example, in the case of the packet of the ethernet as the typical example of the burst communication, the maximum data length thereof is about 1,500 bytes. When that data is subjected to the 16 quadrature amplitude modulation, the packet size thereof becomes about 3,000 symbols. Assuming that the preamble of 500 to 1,000 symbols for example is added to the head portion of that data, the frame efficiency is in the range of 75 to 86%. However, actually, since the auxiliary bits which are necessary for the recovery of the carrier, the timing recovery, the training of an equalizer and the like need to be added to the preamble field, the frame efficiency is further reduced as compared with the above-mentioned numeric value. Therefore, in the case where the multi-level modulation is applied in the burst communication, how the preamble is shortened is the key to the effective utilization of the band.

In the 16 levels or more quadrature amplitude modulation as the typical example of the multi-level modulation, the coherent detection becomes essential. In order to carry out the coherent detection, the recovery of the carrier from the received signal and the recovery of the timing signal need to be carried out with a high accuracy.

Heretofore, the structure of a sort of coherent detection and demodulation circuit is explained in an article of "Beginning of Mobile Communication" (by Yoshihisa Okumura et al. and edited by The Institute of Electronics, Information and Communication Engineers), 1986, p.154. In addition, the recovery of the timing signal is explained in the above-mentioned article, p.115. According to the structure of the coherent detection and demodulation circuit disclosed in the above-mentioned article, it is shown that both the operation of recovering the carrier and the operation of recovering the timing signal are carried out simultaneously, and the signal pattern "10101010 . . . " is normally used as the timing signal.

However, according to the above-mentioned conventional methods, the convergence operation of the recovered carrier and the recovered timing clock signal is changed due to the frequency difference between the received carrier and the local oscillator signal, the initial value of the phase difference therebetween, or the initial state of the timing recovery circuit for example. Since the above-mentioned convergence situation is difficult to be obtained analytically, it is difficult to ensure that the coherent detection and demodulation circuit is converged surely and with a high accuracy in a certain preamble length.

SUMMARY OF THE INVENTION

It is therefore an object of the present invention to provide a wireless communication system and communication equipment which are capable of enabling the preprocessing operation, which a reception circuit carries out prior to the reception of the signal from the information transfer field of the communication frame, to be carried out speedily.

It is another object of the present invention to provide a communication system and communication equipment so as to enable the AGC operation, the carrier synchronization and the clock synchronization, which a reception circuit of each communication equipment carries out in the preamble field, to be carried out at a high speed in a communication system for carrying out the communication through the communication frame consisting of the preamble field and the information transfer field.

It is still another object of the present invention to provide a communication system and communication equipment which are particularly suitable for the slow frequency hopping and which are capable of enabling the preprocessing such as the AGC operation, the received carrier synchronization and the recovery of the received symbol timing signal, which a reception circuit of receiver site communication equipment carries out in the preamble field of each communication frame, to be carried out at a high speed in order to carry out the reception operation synchronously with the communication frame produced by transmitter site communication equipment.

It is yet another object of the present invention to provide a communication frame of a preamble form which is suitable for the slow frequency hopped wireless communication system employing the multi-level quadrature modulation and which is capable of enabling the AGC operation, the recovery of the carrier and the recovery of the symbol timing signal in receiver site communication equipment to be carried out at a high speed.

In order to attain the above-mentioned objects, according to the present invention, there is provided a frequency hopped wireless communication system wherein transmitter site communication equipment transmits a continuous wave in a first field of a preamble field of a communication frame, transmits a carrier which is modulated with a symbol timing signal in a second field in the preamble field, and transmits transmission information in an information transfer field subsequent to the preamble field of the communication frame, and receiver site communication equipment completes the AGC operation of a receiver amplifier and the synchronization of the frequency of a received signal with the frequency of the carrier while receiving the signal in the first field of the preamble field of the communication frame, recovers a symbol timing signal while receiving the signal in the second field of the preamble field, and receives an information signal from the information transfer field of the communication frame on the basis of a clock signal which is generated synchronously with the symbol timing signal.

The hopping of the frequency is carried out in such a way that for example, one communication equipment as a control station produces a synchronous frame, and each communication equipment carries out the hopping at the same timing with the synchronous frame as a reference.

Wireless communication equipment according to the present invention includes: an automatic gain control (AGC) circuit for controlling automatically the gain of a receiver amplifier for amplifying a signal received from an antenna in accordance with an electric power of the received signal detected in a first portion of a preamble field of each communication frame; a frequency mixer for mixing an output signal from the receiver amplifier with a local frequency; a carrier recovery circuit for detecting both a frequency and a phase of a carrier from a signal received in a second portion of the preamble field of each communication frame out of the output signals from the frequency mixer, and synchronizing the local frequency with the carrier; a timing recovery circuit for recovering a symbol timing signal from a signal received in a third portion of the preamble field of each communication frame out of the output signals from the frequency mixer; and a demodulation circuit for demodulating a signal received in an information transfer field of each communication frame out of the output signals from the frequency mixer on the basis of a clock signal synchronous with a timing signal outputted from the timing recovery circuit.

Incidentally, in the preamble field of each communication frame, the signal interval for the AGC control and the signal interval for synchronization of the received frequency with the carrier may be previously distinguished clearly from each other so as to correspond to the first portion and the second portion on the frame format, respectively. Alternatively, the procedure may be adopted such that the same signal, e.g., the continuous wave is transmitted continuously to those signal intervals, and then the receiver site communication equipment carries out both the AGC operation and the frequency synchronization in a time series manner on the basis of the received signal from the same field. The symbol timing signal is transmitted to the third portion of the preamble field so as to change the phase every symbol time for example, and then the receiver site communication equipment detects the change in phase of the carrier to recover the symbol timing signal. In addition, in the information transfer field, for example, the transmission information is sent with the 16 levels or more quadrature modulation.

In particular, in the indoor wireless communication system, for example, according to an article of "Statistics of Short Time Variations of Indoor Radio Propagation" IEEE, 1991, pp.1.1.1. to 1.1.5., since the maximum Doppler frequency of the fading is at the most several tens Hz, the variation period of the fading is several tens or more sec. Under such an environment, if the burst length (the frame length) is short, i.e., a few msec, the variation in amplitude and phase in each burst can be substantially neglected.

The present invention is designed in such a way that the AGC is carried out at a high speed in the preamble field in the head portion of each communication frame, and while maintaining the gain of the receiver amplifier fixed after adjustment of the gain in the preamble field, the processing of receiving the transmission information in the information transfer field is carried out. In this case, since the variation in amplitude and phase in the information transfer field can be substantially neglected, even if the reception operation is carried out with the fixed gain, there is no hindrance in reception of the transmission information.

In addition, the preamble field is divided into the first field for the AGC and recovery of the carrier and the second field for recovery of the timing signal. Then, in the first field, for example, the continuous wave is transmitted, whereby both the detection of the received electric power necessary for the AGC in the receiver site and the operation of fetching the PLL in the carrier frequency are carried out at a high speed. In addition, after the carrier has been recovered by the PLL, the timing signal is received in the second field, whereby both a component I and a component Q can be fetched from the base band signal after detection with the component I and the component Q perfectly separated.

The signal which is obtained by superimposing the timing signal pattern on only one component of the quadrature amplitude modulation, e.g., the component I is transmitted to the second field, whereby the base band of the timing signal can be received from the beginning of the synchronization operation at a maximum sensitivity.

As described above, according to the present invention, the receiver site communication equipment can estimate the electric power of the received signal, the frequency and the phase of the received carrier, and the timing of the received symbol periodically at a high speed, and therefore, the relatively inexpensive AGC in which even when the communication frame is long, the frame error rate can be reduced and also the digital processing can be executed easily can be applied to the present invention.

The foregoing and other objects, advantages, manner of operation and novel features of the present invention will be understood from the following detailed description when read in conjunction with the accompanying drawings.

BRIEF DESCRIPTION OF THE DRAWINGS

FIG. 1 is a block diagram showing a configuration of an example of communication equipment constituting a Blow frequency hopped wireless communication system according to the present invention;

FIG. 2 is a schematic view showing an embodiment of a communication frame structure used in the communication system;

FIG. 3 is a schematic view showing an example of a signal waveform of a preamble of the communication frame;

FIG. 4 is a schematic view useful in explaining an embodiment of a method of estimating a received electric power;

FIG. 5 is a schematic view useful in explaining another embodiment of a method of estimating a received electric power;

FIG. 13 is a schematic view showing an IQ-plane on which a phase point of a modulated signal, in which a carrier phase is changed by $\pi$ for every symbol in the preamble structure, is plotted;

FIG. 14 is a block diagram showing a configuration of an embodiment of a timing recovery circuit 106;

DESCRIPTION OF THE PREFERRED EMBODIMENTS

Figure 6:
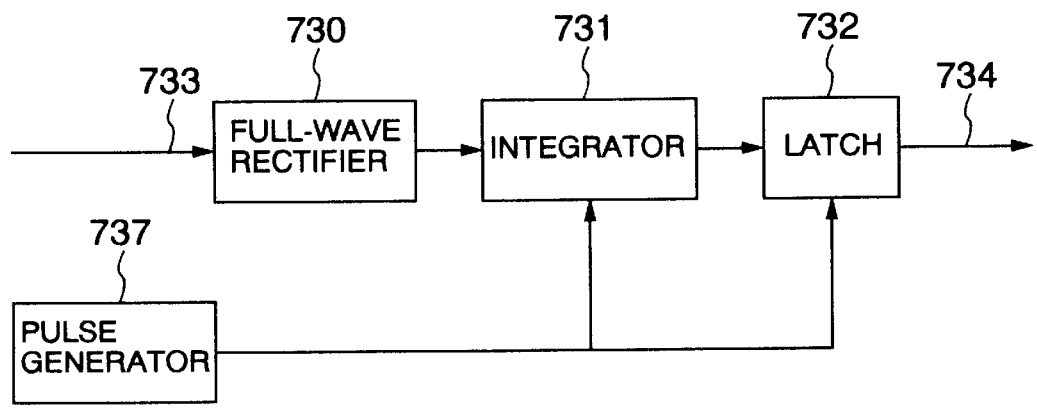
FIG. 6 is a block diagram showing a configuration of an embodiment of a circuit 801 for estimating a received electric power.

The preferred embodiments of the present invention will hereinafter be described in detail with reference to the accompanying drawings.

FIG. 1 is a block diagram showing a configuration of an embodiment of communication equipment constituting a slow frequency hopped wireless communication system according to the present invention, and FIG. 2 is a schematic view showing an embodiment of a structure of a communication frame which is applied to the communication system shown in FIG. 1.

Referring to FIG. 2, the communication frame consists of two fields of a preamble field 741 and an information transfer field 742. The preamble field 741 consists of four fields of a ramp field 701, a received electric power measuring field 702, a carrier recovery field 703 and a timing recovery field 704. In addition, the information transfer field 742 consists of four fields of a unique word field 705, a transmitting station ID field 706, a control station flag field 707 and an information field 708.

In the present embodiment, each of the fields has the fixed length. Incidentally, both the received electric power measuring field 702 and the carrier recovery field 703 may be unified into one field depending on the signals transmitted in those fields. Each communication equipment carries out the hopping operation of the transmission/reception frequency (the carrier frequency) with a period equal to or longer than the frame period of the communication frame, i.e., carries out the so-called slow frequency hopping.

Firstly, the description will hereinbelow be given with respect to the reception operation of the communication equipment 1 with reference to FIG. 1.

A modulated signal which has been received by a transmission/reception antenna 101 is supplied to a band pass filter 117 through a transmission/reception change-over switch 102. At the time when a carrier level detection circuit 119 detects (carrier-senses) the leading portion of the received signal of the received electric power measuring field 702 in the preamble field 741 of each reception frame which has been outputted from the band pass filter 117, the circuit 119 informs both an automatic gain control circuit 104 and a microprocessor 113 of that the circuit 119 has detected the leading portion of the received signal.

The automatic gain control circuit 104 which has been notified of that information measures the electric power of the received signal on the basis of the magnitude of the received electric power measuring field signal which has been subjected to the band width limitation in the band pass filter 117, and controls the gain. The automatic gain control is completed within a limited time period corresponding to the received electric power measuring field 702 by a control signal (its illustration is omitted here) which has been outputted from the microprocessor 113. Thereafter, the received signal is amplified with the fixed gain and then the received signal having the suitable amplitude is supplied to a circuit of following stage.

The received signal which has been outputted from the automatic gain control circuit 104 is inputted to both frequency mixers 103 and 123. The output signal of a synthesizer 111 having an oscillation frequency approximately equal to the central frequency of the received modulated signal is inputted to the frequency mixer 103, while the signal which is obtained by applying the output signal of the synthesizer 111 to a $\pi/2$ phase shifter 121 so as to lead that output signal by a phase angle of $\pi/2$ is inputted to the frequency mixer 123. Incidentally, the synthesizer 111 is also controlled by the microprocessor 113. But, for the sake of simplicity, a control signal is not illustrated in the figure.

Each of the frequency mixers 103 and 123 mixes the received signal outputted from the automatic gain control circuit 104 with the input frequency. The base band signal of a component I and the base band signal of a component Q are respectively recovered through a low pass filter 124 and a low pass filter 125 from the mixed output signal, and both the components I and Q are inputted to a demodulator 120.

At the time point when the time corresponding to the length of the received electric power measuring field 702 has elapsed from the reception time of the carrier sense notification outputted from the carrier level detection circuit 119, the microprocessor 113 instructs a carrier frequency/phase estimation circuit 105 to start the operation, and at the time point when the time corresponding to the length of the carrier recovery field 703 has elapsed, the microprocessor 113 instructs the symbol timing recovery circuit 106 to start the operation.

The carrier frequency/phase estimation circuit 105 which has received the operation start instruction issued from the microprocessor 113 detects the phase difference between the received carrier and the output signal of the synthesizer 111 on the basis of the base band signals of the carrier recovery fields 703 which have been outputted from the low pass filters 124 and 125, respectively, and controls the synthesizer 111 so as for the phase difference to become "0".

In addition, the symbol timing recovery circuit 106 which has received the operation start instruction issued from the microprocessor 113 detects the boundary of the received symbol on the basis of the base band signal of the timing recovery field 704 which has been outputted from one of the frequency mixers (in this example, the frequency mixer 123), and supplies the data relating to the symbol timing to both the demodulator 120 and the microprocessor 113.

The demodulator 120 fetches the digital demodulated signal "1" or "0" from the base band signal of the fields 705 to 708 of the information transfer field 743 in accordance with the symbol timing to output the digital demodulated signal to the microprocessor 113. Then, the microprocessor 113 reads out the received digital signal thus demodulated in accordance with the recovered symbol timing to store the received data in a memory 114. The received data stored in the memory 114 is saved in a secondary memory device 115.

Next, the description will hereinbelow be given with respect to the transmission operation of the communication equipment 1.

The microprocessor 113 transfers the data which has been read out from either the memory 114 or the secondary memory device 115 to a gray coding circuit 109 in accordance with a transmission clock signal produced by a transmission clock producing circuit 110.

The gray coding circuit 109 subjects the data value which has been received from the microprocessor 113 to the gray coding processing. The output signal of the gray coding circuit 109 is inputted to a quadrature amplitude modulator 108 which produces a quadrature amplitude modulated base band signal. The component I of the quadrature amplitude modulated base band signal and the component Q thereof are inputted to frequency mixers 127 and 107, respectively.

The frequency mixer 107 mixes the above-mentioned base band signal with the output signal of the synthesizer 111. In addition, the frequency mixer 127 mixes the above-mentioned base band signal with the output signal which is obtained by applying the output signal of the synthesizer 111 to the π/2 phase shifter so as to lead that output signal by a phase angle of π/2. As a result, both the component I and the component Q of the quadrature amplitude modulated signal having a central frequency equal to the oscillation frequency of the synthesizer 111 are produced.

Both the component I and the component Q are added to each other by an adder 122 to be the quadrature amplitude modulated signal and then are transmitted as a radio signal from the transmission/reception antenna 101 through both a band pass filter 118 and the transmission/reception changeover switch 102.

A PN code generator 112 produces a frequency hopping pattern obeying the pseudo random code in response to the instruction issued from the micro-computer 113 irrespective of the transmission time period and the reception time period, and hops the oscillation frequency of the synthesizer 111.

A communication equipment as a control or master station and a communication equipment as a controlled or slave station are previously given the common frequency hopping pattern and hop the frequency synchronously with each other, thereby carrying out the transmission/reception operation at the same frequency. Incidentally, with the above-mentioned communication equipment, the operator can give the control instruction for the start and stop of the communication, the change of the frequency hopping pattern and the like using an input unit (console) 116.

Next, the description will hereinbelow be given with respect to the structure of the communication frame shown in FIG. 2 through the operation when carrying out the data communication using the two communication equipment shown in FIG. 1 with one as the control station (A) and the other as the controlled station (B).

The communication equipment as the control station (A) switches the frequency of the synthesizer 111 in accordance with the preset frequency hopping pattern, and then transmits in turn the data relating to the contents of the ramp field 701, the received electric power measuring field 702, the carrier recovery field 703 and the timing recovery field 704 constituting the preamble field 741. In addition, the control station (A) transmits the data relating to the contents of the unique word field 705 representing the head field of the information transfer field 742 subsequent to the preamble field 741, and then transmits the equipment ID of its equipment (A) in the transmitting station ID field 706. Next, the control station (A) transmits the data representing that its equipment is the control station, e.g., "1" in the control station flag field 707 and finally transmits the transmission data to the other party, i.e., the communication equipment (B) in the information field 708.

After completing the operation of transmitting the information in the above-mentioned information transfer field 742, the control station (A) switches the current frequency of the synthesizer 111 to a new frequency in accordance with the preset frequency hopping pattern, and carries out the reception operation for a next one frame time period.

In the reception operation, the control station (A) receives the preamble field 741 which has been transmitted by the communication equipment as the controlled station (B), and carries out the automatic gain control, the carrier recovery and the timing signal recovery. In addition, the control station (A) detects the unique word field 705 in the head field of the information transfer field 742, thereby recognizing the beginning of the information transfer field. Next, the control station (A) receives both the transmitting station ID field 706 and the control station flag field 707, thereby recognizing that the received frame of interest has been transmitted by the controlled station (B). At the time when receiving the data relating to the contents of the information field 708, the control station (A) switches the current frequency of the synthesizer 111 to a new frequency in accordance with the preset frequency hopping pattern, and the carries out repeatedly the above-mentioned operation.

On the other hand, the communication equipment as the controlled station (B) sets the frequency of the synthesizer 111 to "a predetermined waiting frequency" which is one of a plurality of hopping frequencies used by the control station (A), and then carries out the reception operation.

If the predetermined waiting frequency matches with the frequency which the control station (A) sets, the controlled station (B) receives the preamble field 741 which has been transmitted by the control station (A), and carries out the above-mentioned automatic gain control, carrier recovery and timing signal recovery. In addition, the controlled station (B) can recognize the beginning of the information transfer field 742 on the basis of detection of the unique word field 705, and receives both the transmitting station ID field 706 and the control station flag field 707, thereby recognizing that the received frame of interest has been transmitted by the control station (A). Finally, at the time when receiving the data relating to the information field 708, the controlled station (B) switches the current frequency of the synthesizer 111 to a new frequency in accordance with the preset frequency hopping pattern, and then carries out the transmission operation in the next frame.

In the transmission operation, the controlled station (B) transmits the data relating to the contents of the ramp field 701, the received electric power measuring field 702, the carrier recovery field 703 and the timing signal recovery field 704 in turn. Next, the controlled station (B) transmits the unique word field 705 representing the head field of the information transfer field 742. In addition, the controlled station (B) transmits the equipment ID of its equipment in the transmitting station ID field 706 and transmits the data representing that its equipment is the controlled station (B), e.g., "0" in the control station flag fields 707, and then transmits the transmission data to the other party, i.e., the communication equipment (A) in the information field 708.

At the time when completing the transmission operation with respect to the contents of the information transfer field 742, the controlled station (B) switches the current frequency of the synthesizer 111 to a new frequency in accordance with the preset frequency hopping pattern, and carries out repeatedly the abovementioned operation.

FIG. 3 shows an example of the signal in the preamble field 741 in the communication frame. The preamble field 741 consists of the ramp field 701 for weakening the change in the envelope in order to prevent the increasing of the transmitter spurious due to the envelope change at the beginning of transmission, the received electric power measuring field 702 constituted by the continuous wave, the carrier recovery field 703 constituted by the continuous wave, and the timing recovery field 704 in which the phase of the carrier is hanged every symbol by π.

The continuous wave having the fixed magnitude of the envelope is used in the received electric power measuring field 702 for the AGC, whereby the time period required for the averaging can be shortened and also the field length can be shortened. In addition, the continuous wave is also used in the carrier recovery field 703, whereby the phase difference between the received carrier and the received signal can be detected in the range of ± π without ambiguity.

In addition, in the timing recovery field 704, the phase of the carrier is changed every symbol by π, whereby the phase change in the symbol boundary can be maximized and hence the magnitude of the phase shift in the timing can be detected at a maximum sensitivity.

FIG. 4 shows an example of a method of estimating the received electric power which is carried out in the received electric power measuring field 702 shown in FIG. 3.

The continuous wave 721 is subjected to the full wave rectification, thereby obtaining a full wave rectified signal 723. Since in the full wave rectified signal 723, the same waveform appears repeatedly every half period of the continuous wave 721, if the full wave rectified signal 723 is integrated over a half period 722 of the continuous wave 721, or a time period which is an integral multiple of the half period 722, the integrated value is obtained which is proportional to a mean amplitude 724. Since the integration interval 722 is independent of the phase of the integration starting point if the interval matches with the integral multiple of the half period, even before carrying out the timing signal recovery, the accurate received electric power can be measured over half the period of the carrier.

FIG. 6 shows an example of a circuit for measuring the received electric power for implementing the measurement method shown in FIG. 4.

The continuous wave constituting the received electric power measuring field 702 shown in FIG. 3 is inputted to a signal line 733. After has been subjected to the full wave rectification in a full wave rectifier 730, the input signal is integrated by an integrator 731.

A pulse signal which has been generated every integral multiple of the half period of the carrier by a pulse generator 737 is inputted to both the integrator 731 and a latch 732 such that the integrator 731 is cleared every integral time and also the integral value just before clearing the integrator 731 is held in the latch 732. As a result, the signal relating to the integral value which is proportional to the amplitude of the input signal is outputted from the latch 732 to an output line 733.

Now, when the gain is intended to be adjusted with an amplitude accuracy of 10% by the AGC, assuming that the noise contained in the received input signal 733 is the white Gaussian random noise, in order to make a probability deviating from that adjustment range within 1%, the amplitude of the noise component contained in the output signal 734 of the latch needs to be made within 10/3=3.3% in rms.

In general, in the case where the communication having the bit error rate of about 1E-6 (=$10^{-6}$) is carried out utilizing the 16QAM, the S/N ratio of about 20 dB is required in the static characteristic. In this case, the noise component of about 10% of the signal amplitude in rms is contained in the signal. Therefore, the noise component needs to be reduced to ⅓ in amplitude and to ⅙ in electric power.

Therefore, if the interval of the pulse signal generated by the pulse generator 737 is made 9 or more times as long as the half period of the carrier, the gain can be adjusted with the deviation probability of 1% or less and with the amplitude accuracy of 10%. Thus, according to the present embodiment, if there is the time period which is at least 4.5 times as long as the period of the carrier, the amplitude of the received signal can be measured with an accuracy of 10%. In addition, in the case where the gain adjustment has to be carried out with the amplitude accuracy of 30%, the amplitude of the noise component contained in the latch output signal 734 has only to be made within 30/3=10% in rms, and hence the amplitude of the received signal can be measured for a time period half the period of the carrier.

FIG. 5 shows another embodiment of the method of estimating the received electric power utilizing the received electric power measuring field 702 shown in FIG. 3.

When the continuous wave 721 is squared by a multiplier, a square wave 725 is obtained. Since in the square wave 725, the same waveform appears repeatedly every time period half the period of the continuous wave 721, if the square wave 725 is integrated over a half period 722 of the continuous wave 721, or a time period which is an integral multiple of the half period 722, the value which is proportional to the mean electric power 726 is obtained. The integral interval 722 is independent of the integration starting point if the length of the integral interval matches with the integral multiple of the half period of the continuous wave 721. Therefore, even before carrying out the recovery of the timing signal, the accurate value of the electric power can be measured for a time period half the period of the carrier.

Figure 7:
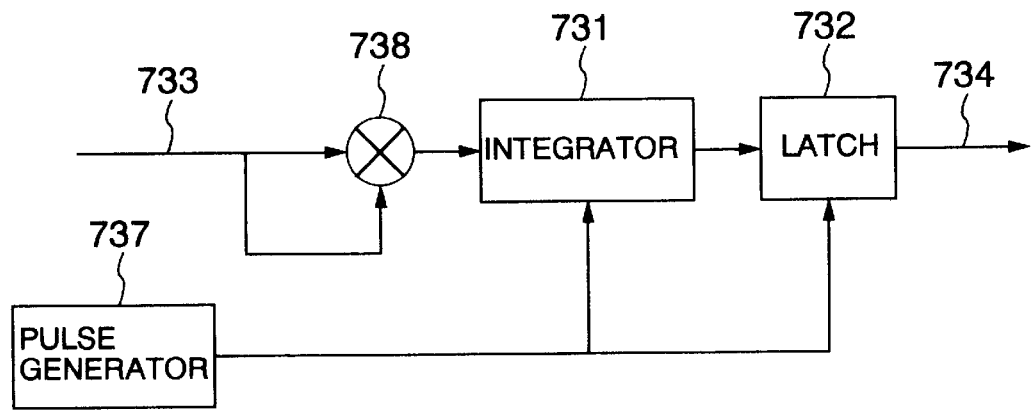
FIG. 7 is a block diagram showing a configuration of another embodiment of a circuit 801 for estimating a received electric power.

FIG. 7 shows an example of a circuit for measuring the received electric power for realizing the measurement method shown in FIG. 5.

The continuous wave constituting the received electric power measuring field 702 is inputted to a multiplier 738 through a signal line 733 and is squared and then is integrated by an integrator 731.

A pulse generator 737 generates a pulse signal every time period which is an integral multiple of the half period of the carrier, and the resultant pulse signals are inputted to both the integrator 731 and a latch 732 such that the integrator 731 is cleared every integral time, the integral value just before clearing the integrator 731 is held in the latch 732, and the data relating to the value which is proportional to the electric power of the received input signal 733 is inputted to an output line 734.

Similarly to the description with respect to the embodiment shown in FIGS. 4 and 6, if there is the time period which is at least 4.5 times as long as the period of the carrier, the received electric power can be measured with an accuracy of 1% since the noise component of the measured received amplitude is 10%. In addition, if there is the time period which is 0.5 times as short as the period of the carrier, the received electric power can be measured with an accuracy of 9% since the noise component of the measured received amplitude is 30%.

Figure 8:
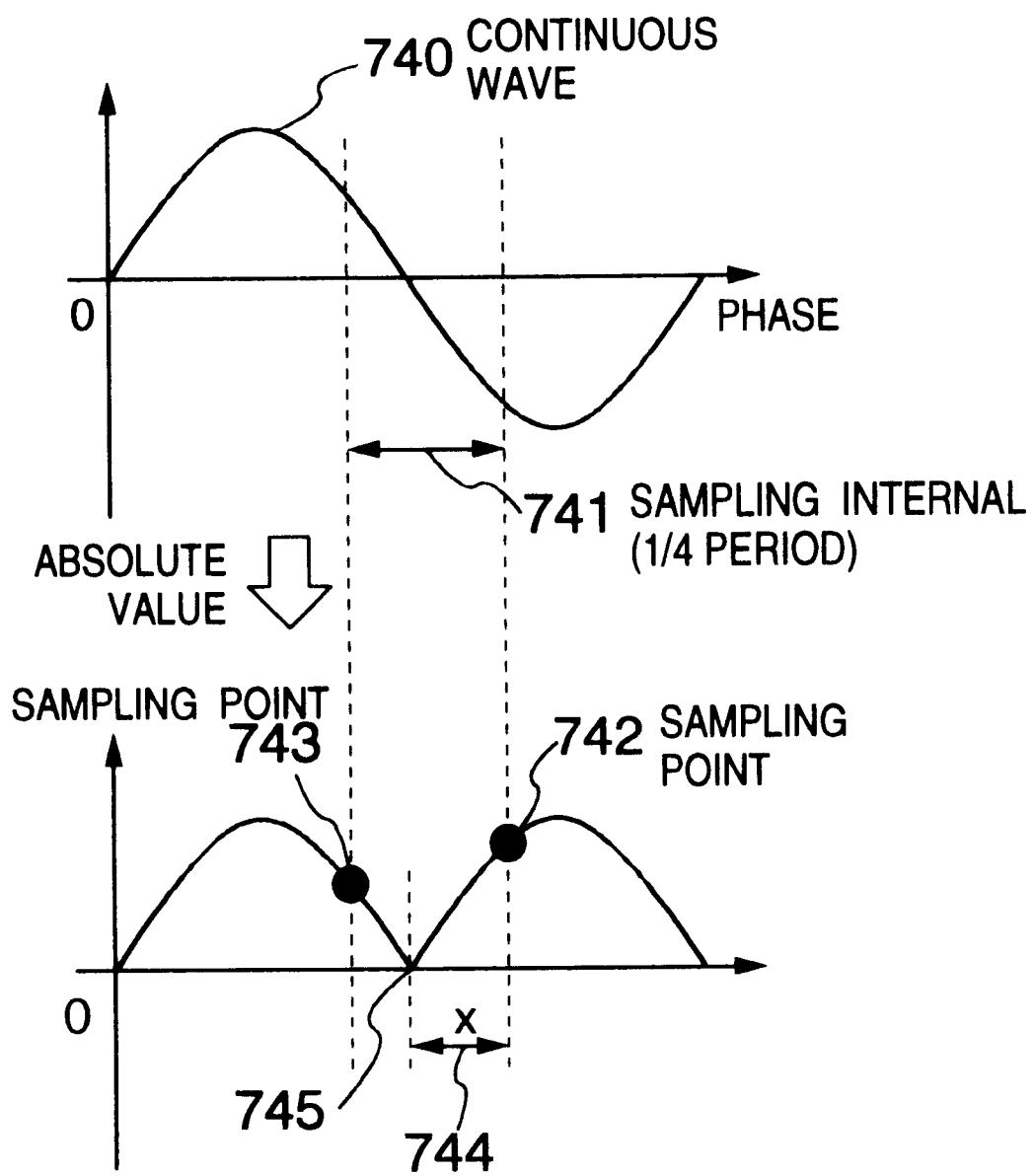
FIG. 8 is a schematic view useful in explaining still another embodiment of a method of estimating a received electric power.

FIG. 8 shows still another embodiment of the method of estimating the received electric power utilizing the received electric power measuring field 702.

When the absolute values of a continuous wave 740 are obtained and the absolute values are sampled with a sampling frequency which is 4 times as high as the frequency of the carrier, the interval 741 of the sampling time is ¼ of the period of the carrier. When with respect to those sampling points, out of the adjacent two sampling points, the larger sampling value is referred to as a sampling point 742 and the smaller sampling value is referred to as a sampling point 743, and the phase difference between a zero cross point 745, between the sampling points 742 and 743, and the larger sampling point 742 is $x(\pi/4 \leq x \leq \pi/2)$, the sampling value of the sampling point 742 is expressed by Asin (x), and the sampling value of the sampling point 743 is expressed by $|A\sin(x \pm \pi/2)| = A\cos(x)$. In those expressions, A represents the amplitude of the continuous wave 740.

Now, considering the magnitude expressed by y =Asin (x)+Acos(x)/2, the relationship of y=A ×(√5)/2sin (x+α) is established where tan (α)=½. Then, since the relationship of $\pi/4 \leq x \leq \pi/2$ is established, $A \leq y \leq 1.118A$ is obtained (when x=π/2, a minimum value is obtained, and when x=0.3524π, a maximum value is obtained).

That is, the smaller sampling value of the continuous and arbitrary two sampling points which are obtained by over sampling the full wave rectified output signal of the continuous wave with the frequency 4 times as high as that of the carrier is multiplied by ½, and the resultant value has only to be added to the larger sampling value, whereby the amplitude of the continuous wave can be measured with the maximum error of 1.118-fold. Since 1.118-fold in amplitude corresponds to about 0.97 dB, according to the present embodiment, the electric power of the continuous wave 740 can be estimated with an accuracy of about 0.97 dB. In addition, since the calculation shown in the present embodiment can be simply subjected to the digital processing in the circuit including a comparator, an adder, and a bit shifter, in particular, it is suitable for the electric power estimation portion of the digital AGC.

Figure 9:
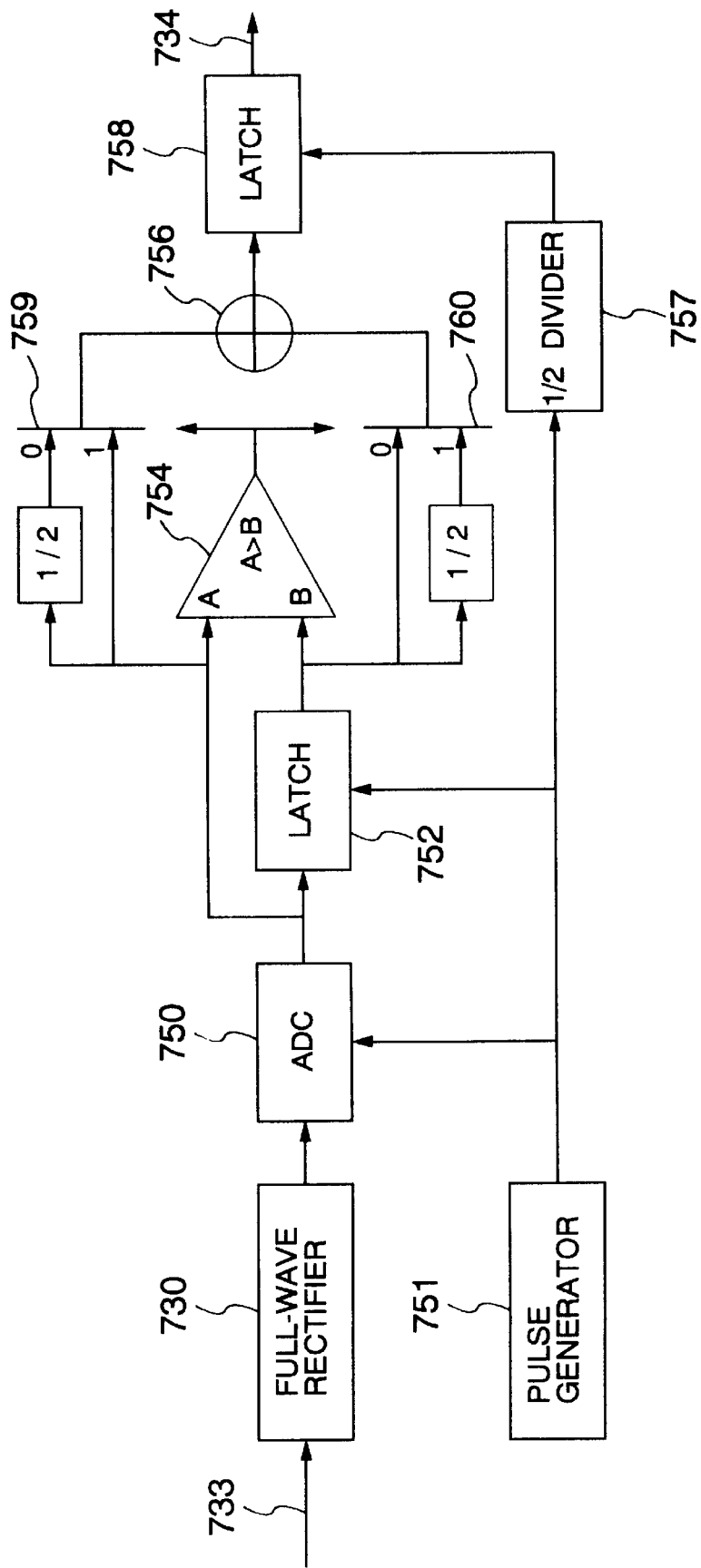
FIG. 9 is a block diagram showing a configuration of still another embodiment of a circuit 801 for estimating a received electric power.

FIG. 9 shows an example of a circuit for measuring the received electric power for realizing the measurement method shown in FIG. 8. The continuous wave constituting the received electric power measuring field 702 shown in FIG. 3 is inputted to an input line 733.

The above-mentioned input signal is subjected to the full wave rectification by a full wave rectifier 730 and then is inputted to an AD converter 750. A pulse generator 751 generates a pulse signal every period ¼ times as short as that of the carrier, and the pulse signals thus generated are inputted as a clock signal to both the AD converter 750 and a latch 752.

The output signal of the full wave rectifier 730 is sampled by the AD converter 750 and also the output signal of the AD converter before one sampling is held in the latch 752 synchronously with the leading edges of the pulse signals. That is, the continuous two sampling values which have been outputted from the full wave rectifier 730 are held by both the AD converter 750 and the latch 752. Those two sampling values are compared with each other by a comparator 754.

When the level of the output signal of the AD converter 750 is higher than that of the output signal of the latch 752, an input signal 1 times as large as the output signal of the AD converter 750 (an input 1 of a selector 759) is selected by the selector 759, and also an input signal ½ times as small as the output signal of the latch 752 (an input 1 of a selector 760) is selected by the selector 760. Those input signals are added to each other by an adder 756 and the resultant signal is inputted to a latch 758.

On the other hand, when the level of the output signal of the latch 752 is higher than that of the output signal of the AD converter 750, an input signal ½ times as small as the output signal of the AD converter 750 (an input 0 of the selector 759) is selected by the selector 759 and also an input signal 1 times as large as the output signal of the latch 752 (an input 0 of the selector 760) is selected by the selector 760. Those input signals are added to each other by the adder 756 and the resultant signal is inputted to the latch 758.

The above-mentioned latch 758 latches the output signal of the adder 756 with the pulse signal, which is obtained by subjecting the output pulse signal of the pulse generator 751 to the ½ dividing in a ½ divider 757, as a clock signal. Since the data holding by the latch 758 is carried out every two samplings of the AD converter 750, the value which is proportional to the amplitude of the received continuous wave which is calculated every two samplings is outputted from the latch 758 to an output line 734.

Figure 10:
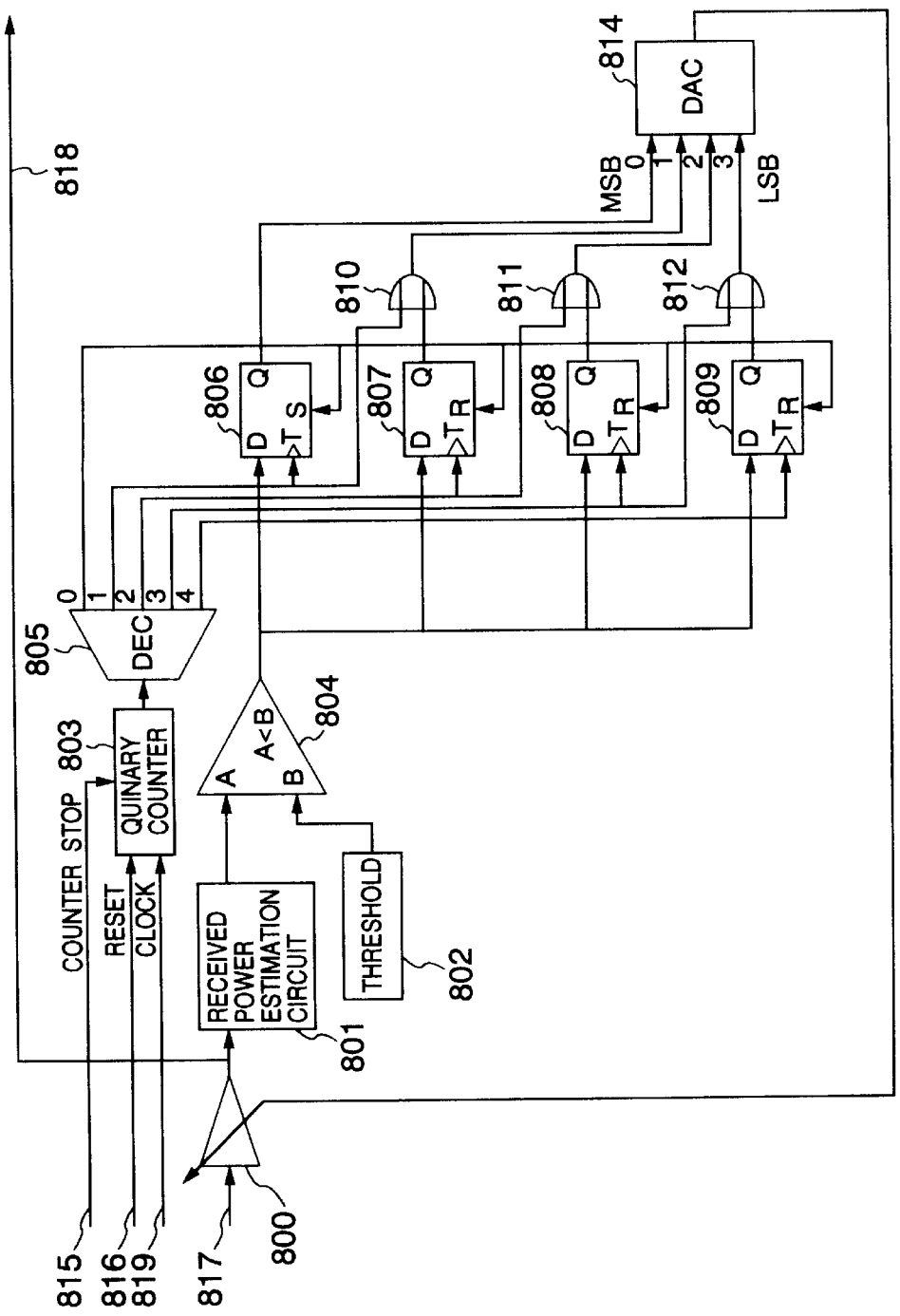
FIG. 10 is a block diagram, partly in circuit diagram, showing a configuration of an embodiment of an AGC circuit.

FIG. 10 is a circuit diagram showing a configuration of an embodiment of the AGC circuit 104.

The continuous wave constituting the received electric power measuring field 702 of FIG. 3 is inputted from an input signal line 817 to an AGC amplifier 800. An output signal of the AGC amplifier 800 is inputted to a received electric power estimation circuit 801 and also is outputted as an AGC output signal to a signal line 818. For example, a circuit having a configuration which was described with reference to FIGS. 6, 7 and 9 can be applied to the received electric power estimation circuit 801.

The start of the AGC operation is specified by making the levels of a counter stop signal line 815 and a reset signal line 816 go to "0" and "1", respectively. The count value of a quinary counter 803 is reset to "0" by those two signals, and only an output 0 of a decoder 805 goes to "1". Since the output 0 of the decoder 805 is connected to both a set input of a D-FF 806 and reset inputs of D-FFs 807 to 809, only an output Q of the D-FF 806 is set to "1" and an output Q of each of other D-FFs 807 to 809 is reset to "0".

As a result, with respect to inputs of a D/A converter (hereinafter, referred to as "a DAC" for short, when applicable) 814, only the bit 0 as MSB goes to "1" and hence the inputs of the DAC are set to "8H". At this time, an output thereof becomes a half the full scale, and the gain of the AGC amplifier 800 is set to a level which is approximately the center of the control range.

The output electric power of the AGC amplifier 800 is measured by the received electric power estimation circuit 801, and the resultant signal is inputted to an input A of the comparator 804. The comparator 804 compares the estimated value of the received electric power with a threshold 802 supplied to an input B. Then, the comparator 894 outputs "1" when the estimated value of the received electric power is smaller than the threshold 802, and outputs "0" when the estimated value of the received electric power is larger than the threshold 802.

Next, when resetting a reset input 816 to "0", the quinary counter 803 carries out the counting up from "0" to "1", "2", "3", "4" in turn at the timing of the leading edges of the clock signal 819. The period of he clock signal 819 is set so as to be longer than the time period required for the change of the quinary counter 803 to reach the D-FFs 806 to 809 through the decoder 805, the D-FFs 806 to 809, OR circuits 810 to 812, the D/A converter 814, the AGC amplifier 800, the received electric power estimation circuit 801 and the comparator 804.

Since the value of the quinary counter 803 goes to "1" at the first leading edge of the clock signal 819, a clock input T of the D-FF 806 goes to "1" so as to latch the output value of the comparator 804. The output of the comparator 804 is "0" when the level of the output signal of the AGC amplifier 800 is higher than the threshold 802, and is "1" when the level of the output signal of the AGC amplifier 800 is lower than the threshold 802. Therefore, in the case where the gain value 8H of the AGC amplifier which is currently set is too large, that is, in the case where the proper gain is in the range of "0H" to "8H", the bit 0 is set to "0", and in the case where that gain value 8H is too small, that is, in the case where the proper gain is in the range of "8H" to "FH", the bit 0 is set to "1".

At this time, since the bit 1 of the inputs of the D/A converter 814 is set to "1" by the OR circuit 810, the input value of the D/A converter 814 becomes "CH" or "4H" depending on the value of the D-FF 806, and the output thereof becomes ¾ or ¼ of the full scale.

When the same operation is repeatedly executed until the value of the quinary counter 805 goes to "4", the output value of the AGC amplifier 800 converges to the value of the threshold 802 within a range of quantizing error of the D/A converter 814. Finally, when the level of the counter stop signal 815 is set to "1", the value of the quinary counter 805 is held at "4", and the input value of the D/A converter 814 at this time becomes the optimal gain value+½ LSB, and the output signal 818 of the AGC amplifier 800 matches with the threshold 802 within the range of quantizing error of the D/A counter 814.

In the case where in the above-mentioned operation, for example, the quantizing bit number of the gain of the AGC amplifier 800 is 8 bits, and the dynamic range of the AGC amplifier 800 is 80 dB, the convergence time of the AGC is as follows.

The gain setting loop of the AGC amplifier 800 can be operated with the larger one of the delay time of the gain setting loop (the time period required for the change in the value of the quinary counter 803 to reach the inputs of the D-FFs 806 to 809 through the decoder 805, the D-FFs 806 to 809, the OR circuits 810 to 812, the D/A converter 814, the AGC amplifier 800, the received electric power estimation circuit 801 and the comparator 804) and the time ½ times as short as the period of the carrier. Therefore, with the time period 8 times as long as that time, the AGC can be converged with an accuracy of 80/256=about 0.3 dB.

In general, since the period of the carrier in the intermediate frequency is one-several numbers or less of the symbol period, if the above-mentioned loop delay time can be much shorter than the period of the carrier using a high speed device, the AGC can be converged with one symbol time or so.

Figure 11:
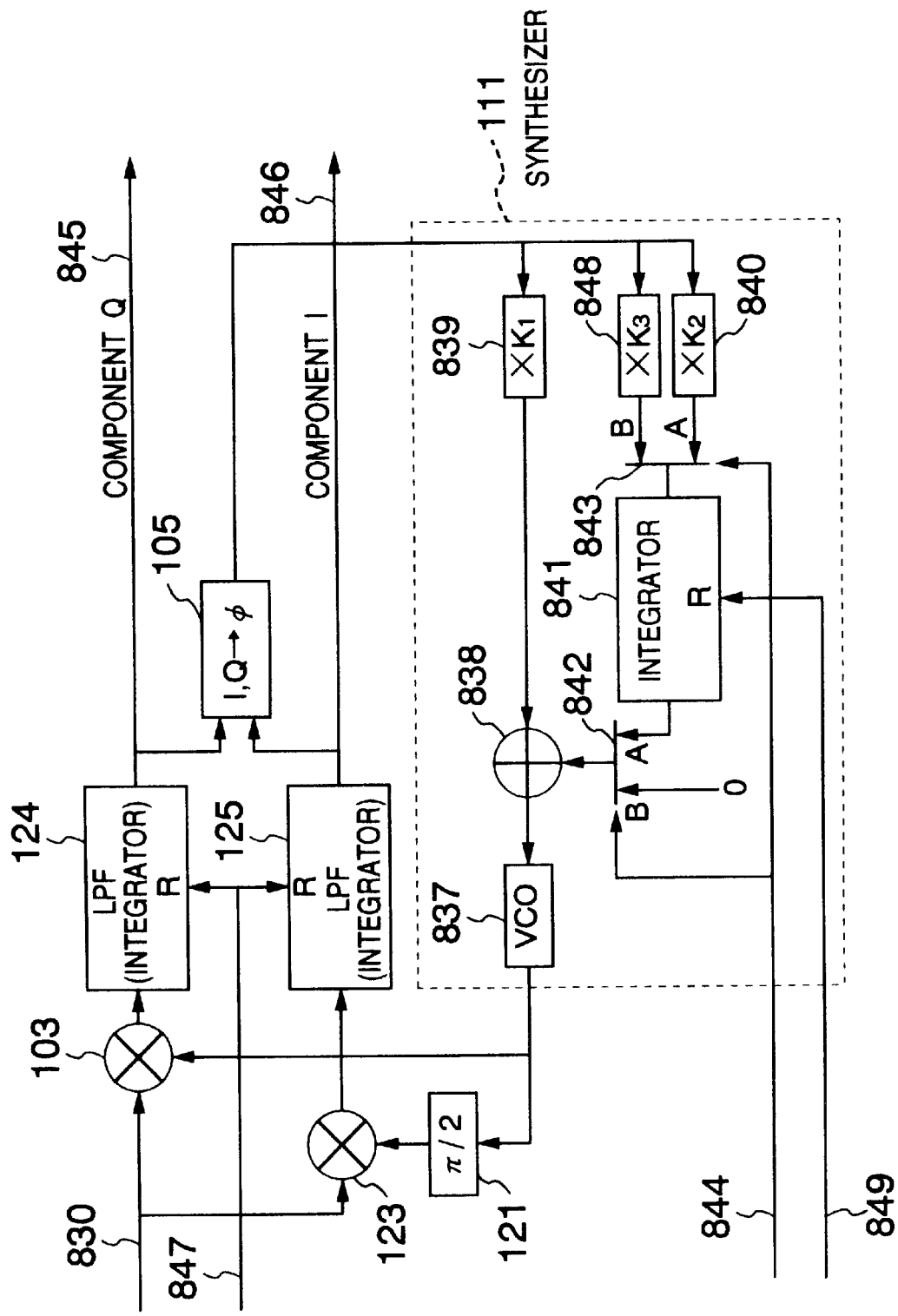
FIG. 11 is a block diagram showing a configuration of an embodiment of a synthesizer 111.

FIG. 11 shows a configuration of a circuit portion for recovering the carrier from the received signal in the carrier recovery field 703.

The circuit portion shown in FIG. 11 includes the frequency mixers 103 and 123, the low pass filters 124 and 125, the carrier frequency/phase estimation circuit 105, and the synthesizer 111 shown in FIG. 1. The continuous wave of the carrier recovery field 703 which has been subjected to the AGC so as to have the predetermined amplitude is inputted from a signal line 830 to the frequency mixers 103 and 123 which mix the continuous waves thus inputted with the local oscillation output signals from the VCO 837, respectively.

The output signal itself of the VCO 837 is supplied to the frequency mixer 103, and the signal which is obtained by applying the output signal of the VCO 837 to the phase shifter 121 so as to lead that output signal by a phase angle of $\pi/2$ is supplied to the frequency mixer 123. Then, if the oscillation frequency and the phase of the output signal of the VCO 837 match with those of the received carrier from the output signal line, the output signals corresponding to the component Q and the component I are outputted from the frequency mixers 103 and 123, respectively.

Those signal components are passed through the low pass filters 124 and 125 each of which is comprised of an integrator which is reset to "0" every time period which is an integral multiple of the period of the carrier by a reset signal 847 from the microprocessor 113 to become an output component Q 845 and an output component I 841, respectively. Reference numeral 105 designates a phase comparator for calculating the expression of $\Phi=\arg(I, Qi)$. Since the input signal from the signal line 830 is the continuous wave, the magnitude of each of the component I and the component Q contained in the input signal is constant. Therefore, if the phase control is carried out in the transmission site communication equipment such that the magnitude of the component Q becomes "0", the level of the output signal of the phase comparator 105 becomes proportional to the amount of phase shift between the phase of the received carrier and the phase of the oscillation signal of the VCO.

In the initial operation, selectors 842 and 843 are made select an input B by a loop filter switching input signal 844. At this time, since the output signal of the phase comparator 105 is multiplied by a constant K1 in a constant multiplier 839 and then is fed back to the VCO 837, the whole carrier recovery circuit constructs the primary PLL.

In the primary PLL, in the case where the steady difference is present between the free-run frequency of the VCO and the frequency of the received carrier, the steady difference proportional to that frequency difference is present between the oscillation phase of the VCO and the phase of the received carrier. Therefore, the level of the output signal of the phase comparator 835 is multiplied by K3 in a constant multiplier 848 which is connected to the input B of the selector 843, and the resultant signal is integrated by an integrator 841 (K3=K1/integral time), whereby it is possible to obtain the steady frequency difference between the free-run frequency of the VCO 837 and the frequency of the received carrier.

Prior to the start of the above-mentioned integration operation, the integrator 841 is reset to "0"by an integration reset instruction signal 849 issued from the microprocessor 113. When the value of the frequency difference is obtained, both the selectors 842 and 843 are switched so as to select an input A. In this case, the secondary loop filter is constituted by both the constant integrators 839 and 840, and the normal secondary PLL operation is started.

Figure 12:
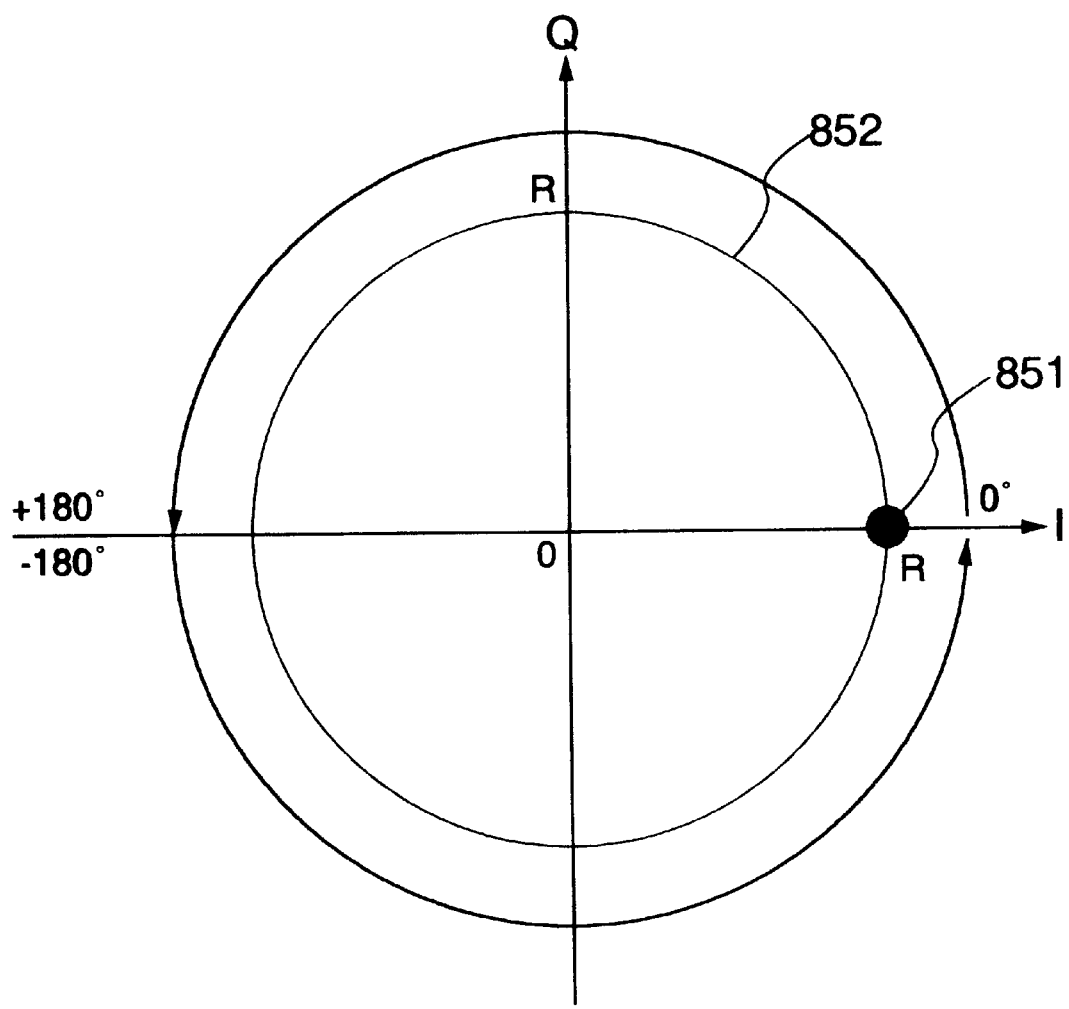
FIG. 12 is a schematic view showing an IQ-plane on which a phase point of a continuous wave portion in a preamble structure is plotted.

FIG. 12 is a schematic view showing an IQ-plane on which the phase point of the continuous wave is plotted, and FIG. 13 is a schematic view showing an IQ-plane on which the phase point of the modulated signal, in which the phase of the carrier is changed by $\pi$ every symbol, is plotted.

In those figures, phase points 851 and 853 represent the phase points which the received signal must take. A circumference 852 represents the set of points which the phase point may take in the case where the frequency and the phase of the received signal having the amplitude of R are not equal to the frequency and the phase of the VCO 837, respectively. Since the phase point which the continuous wave must take is only one point, the phase comparator can detect the phase difference up to ± π radian at the maximum without ambiguity.

On the other hand, with respect to the modulated signal in which the phase of the carrier is changed by π every symbol, since the phase points which the modulated signal must take are two points, the phase comparator can not detect the phase difference only up to ± π/2 at the maximum without ambiguity. In such a way, if the continuous wave is employed, the range in which the phase shift can be detected is maximized, and also the acquisition frequency range can also be increased.

FIG. 14 shows an embodiment of the timing recovery circuit 106 for processing the timing recovery field 704 of the communication frame.

The signal of the timing recovery field 704 which has been amplified so as to have a predetermined amplitude by the AGC circuit 104 is inputted from a signal line 860 to three integrators 861, 873 and 863. The integral value of each of the integrators is reset to "0" by the timing signal which is supplied approximately synchronously with the symbol frequency from the VCO 868, and each of the integrators outputs the signal relating to the integration result every symbol time.

The first integrator 861 is reset to "0" before carrying out the second integrator 873 by a phase angle of π/2, and the third integrator 863 is reset to "0" after carrying out the second integrator 873 by a phase angle of π/2. The output signals of the three integrators are converted into the absolute values by absolute value calculating circuits 871, 873 and 872, respectively, and then are compared with the phases thereof with one another in a phase comparator 865.

Figure 15A:
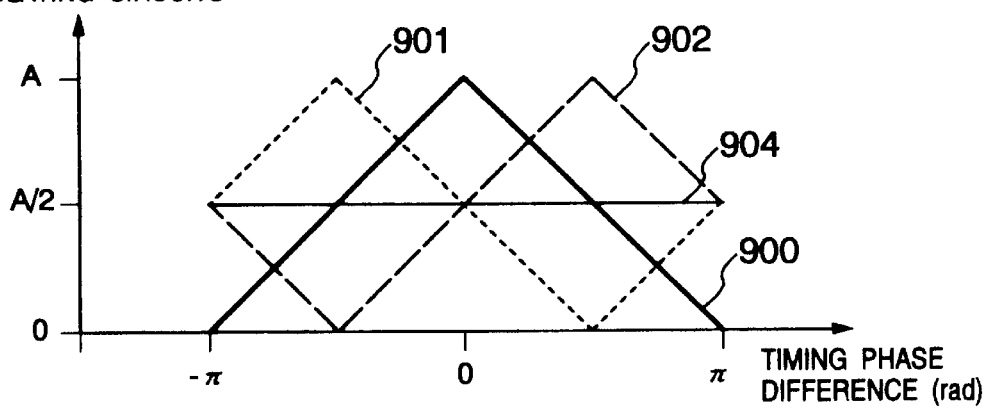
FIG. 15A is a graphical representation showing the relationship between an output of an absolute value calculation circuit and a timing phase difference in the timing recovery circuit 106.
Figure 15B:
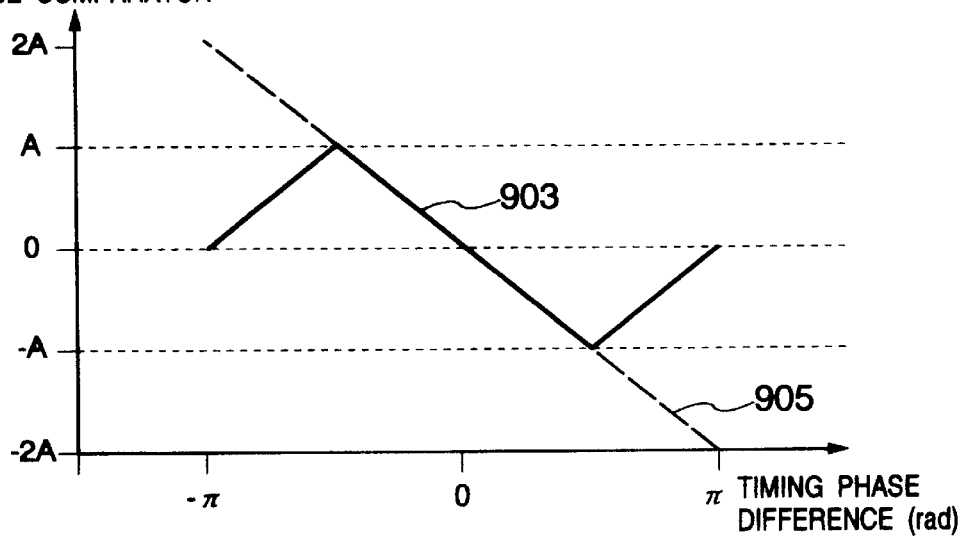
FIG. 15B is a graphical representation showing the relationship between an output of a phase comparator and a timing phase difference in the timing recovery circuit 106.

In FIG. 15A, reference numerals 901, 900 and 902 designate the output signals of the absolute value calculating circuits 871, 873 and 872. FIG. 15B shows the output signal of the phase comparator 865. The output signal 903 of the phase comparator is obtained by subtracting the output signal 902 of the absolute value calculating circuit 872 from the output signal 901 of the absolute value calculating circuit 871.

The output signal 903 of the phase comparator becomes linear if the timing phase difference is in the range of ± π/2. However, the level of the output signal 903 of the phase comparator is decreased as the timing phase difference is further increased in the case where the phase difference is in the range of −π to −π/2 and π/2 to π. In particular, in the case where the timing phase difference is ±π, the level of the output signal 903 of the phase comparator is zero. Therefore, in the case where the timing recovery is carried out using the PLL, since if the timing phase difference is near on in the initial condition, the amount of feedback of the output signal of the phase comparator becomes small and also the response time is increased, the long timing recovery field is required.

Then, we pay attention to the fact that the sum 904 of the output signal 901 of the absolute value calculating circuit 871 and the output signal 902 of the absolute value calculating circuit 872 always becomes A/2. That is, when the level of the output signal 900 of the absolute value calculating circuit 874 is larger than the sum 904 of the output signal 901 of the absolute value calculating circuit 871 and the output signal 902 of the absolute value calculating circuit 872, the value of the output signal 903 of the phase comparator is employed, and when the level of the output signal 900 of the absolute value calculating circuit 874 is smaller than the sum 904 of the output signal 901 of the absolute value calculating circuit 871 and the output signal 902 of the absolute value calculating circuit 872, the value of the corrected output signal 905 of the phase comparator is employed which is obtained by folding the portion of the graph of the output signal 903 of the phase comparator in the range in which the absolute value of the timing phase difference is larger than π/2. Then, a linear output signal of the phase comparator can be obtained in all the range of −π to π and also the symbol timing can be recovered with the short timing recovery field.

In the timing recovery circuit shown in FIG. 14, the output signal of the phase comparator 865 thus obtained is multiplied by a constant (K) in the constant multiplier 866 and then is returned to the VCO 868. In such a way, the PLL is configured, the timing signal thus recovered is outputted as the symbol timing signal from the signal line 869.

Figure 16:
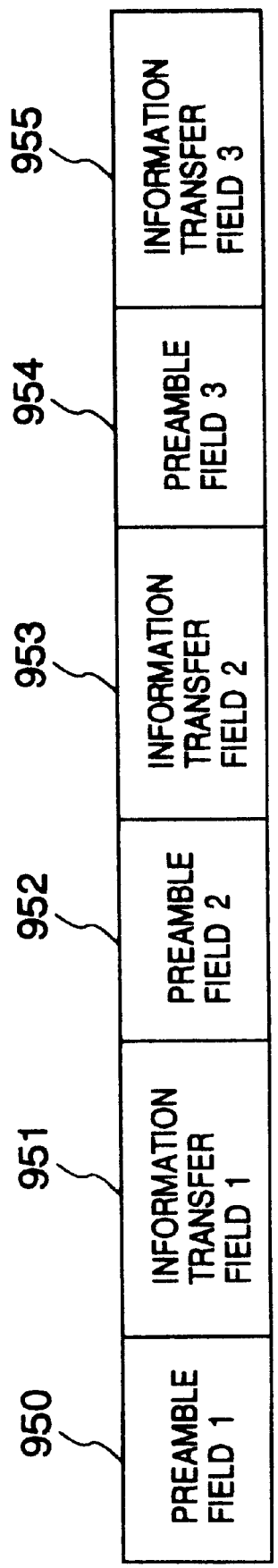
FIG. 16 is a schematic view showing another embodiment of the communication frame structure which is applied to the present invention.

FIG. 16 shows another embodiment of the communication frame which is applied to the present invention.

In this example, three preamble fields 950, 952 and 954 are present in one communication frame, and after the preamble fields, information transfer fields 951, 953 and 955 are provided, respectively. In this case as well, the hopping of the carrier frequency is carried out with the period longer than the frame period.

In general, the state of the radio transmission path changes with time. For example, according to the above-mentioned article entitled "Statistics of Short Time Variations of Indoor Radio Propagation", IEEE, 1991, pp.1.1.1. to 1.1.5., it is said that the period of the change in the indoor transmission path is at most about several tens msec. Therefore, if the AGC, the recovery of the carrier, and the timing signal recovery are periodically carried out in the preamble field with the length of each of the information transfer fields 951, 953 and 955 made equal to or shorter than several msec, even the long communication frame can be stably received.

As apparent from the above description, according to the present invention, for example, in the slow frequency hopped wireless communication system employing the multi-level quadrature amplitude modulation, the AGC can be converged for about one symbol time period, and also the reduction of the frame efficiency can be held to a minimum.

In addition, according to the present invention, since for example, the electric power of the received signal, the frequency of the received carrier, the phase of the received carrier, the received symbol timing or the like can be estimated periodically and at a high speed in the receiver site communication equipment, the frame error rate can be reduced even when the communication frame is long. In addition, when the electric power of the received signal is estimated using the continuous wave portion, the inexpensive AGC by which the digital processing can be carried out readily can be mounted on the communication equipment.

As the present invention may be embodied in several forms without departing from the sprit of essential characteristics thereof, the above-mentioned embodiments are therefore illustrative and not restrictive, since the scope of the invention is defined by the appended claims rather than by the description preceding them, and all changes that fall within meets and bounds of the claims, or equivalence of such meets and bounds are therefore intended to embraced by the claims.

What is claimed is:

1. A radio communication system in which a communication frame including a preamble field and an information transfer field is transmitted from transmitter site communication equipment, and receiver site communication equipment receives the information transmitted in the information transfer field of the communication frame synchronously with a timing signal recovered from the preamble field, wherein the preamble field of the communication frame includes a first portion and a second portion succeeding the first portion, and wherein said receiver site communication equipment includes:

automatic gain control means for adjusting automatically the gain of a receiver amplifier in accordance with an electric power of the received signal in the first portion of the preamble field;

carrier recovering means for detecting both a frequency and a phase of a carrier of the received signal in the first portion of the preamble field, and recovering the carrier of the received signal using a local frequency synchronized with a frequency of the carrier;

clock producing means for recovering a timing signal from the received signal in the second portion of the preamble field and generating a clock signal having a symbol frequency with the timing signal thus recovered; and means for receiving the information which has been transmitted in the information transfer field of the communication frame synchronously with the clock signal having the symbol frequency, wherein said transmitter site communication equipment includes means for sending a transmission carrier with no modulation in the first portion of the preamble field of the communication frame and sending a carrier, a phase of which is changed every symbol, in the second portion, and wherein said receiver side communication equipment carries out an operation of controlling automatically the gain and an operation of synchronizing the local oscillation frequency with the carrier on a basis of results of receiving a continuous carrier in the preamble field of each communication frame.

2. A radio communication system according to claim 1, wherein said transmitter site communication equipment transmits as said communication frame a frame including a plurality of information transfer fields and a preamble field provided in every information transfer field, and wherein said receiver site communication equipment includes means for making said automatic gain control means and said clock producing means carry out an automatic gain control operation and a timing signal recovering operation, respectively, in each preamble field in the received communication frame.

3. A radio communication system according to claim 1, wherein said transmitter site communication equipment includes means for subjecting the transmitted carrier to the quadrature amplitude modulation, in accordance with the transmitted information, in the information transfer field of the communication frame; and wherein said receiver site communication equipment further includes:

means for converting an output signal of said receiver amplifier into a quadrature amplitude modulated signal using a local oscillation frequency; and means for detecting, after completing an automatic gain control operation of said receiver amplifier, both a frequency and a phase of the carrier from the received signal in the first portion of the preamble field of the communication frame and synchronizing the local oscillation frequency with the frequency of the carrier.

4. A radio communication system according to claim 1, wherein said transmitter site communication equipment includes means for hopping the frequency of the carrier of the communication frame in accordance with a predetermined hopping pattern, and wherein said receiver site communication equipment includes means for hopping the local frequency synchronously with said transmitter site communication equipment in accordance with a predetermined hopping pattern.

5. A radio communication system according to claim 1, wherein said transmitter site communication equipment hops the frequency of the carrier with a low hopping frequency in which the frequency is fixed during a time period required for transmitting one communication frame.

6. Radio communication equipment for communicating with other communication equipment using a communication frame including a unmodulated carrier portion in a head portion of a preamble field provided prior to an information transfer field, comprising:

first means for over-sampling a received signal with a frequency 4 times as high as a carrier frequency during a time period prior required for receiving the unmodulated carrier portion located in a head portion of a received frame;

second means for obtaining a sum of a value ½ times as small as that of a smaller one of arbitrary and continuous two sampling values which are obtained by the over-sampling and a value of a larger one thereof; and gain control means for comparing a value of the sum obtained in said second means with a threshold, and decreasing a gain of a receiver amplifier when the value of the sum is larger than the threshold and increasing the gain of said receiver amplifier when the value of the sum is smaller that the threshold and increasing the gain of said receiver amplifier when the value of the sum is smaller than the threshold, thereby adjusting an output signal of a reception circuit.

7. Radio communication equipment for communicating with other communication equipment through a communication frame including a preamble field and an information transfer field succeeding the preamble field, comprising:

an automatic gain control circuit for controlling automatically the gain of an amplifier for amplifying a received signal in accordance with an electric power of the received signal which has been detected in a first portion of the preamble field;

a frequency mixing circuit for mixing the amplified signal with a local frequency;

a carrier synchronous circuit for detecting both a frequency and a phase of a carrier of the received signal in an output signal from said frequency mixing circuit, both the frequency and the phase of carrier are detected in a second portion succeeding the first portion of the preamble field, and synchronizing the local frequency with the frequency of the carrier;

a timing recovery circuit for recovering a symbol timing signal from the output signal, the symbol timing signal is recovered from a third portion succeeding the second portion of the preamble field; and a signal demodulation circuit for demodulating the information transfer field of the output signal on the basis of a clock signal synchronous with the symbol timing signal which has been recovered in said timing recovery circuit, wherein said automatic gain control circuit comprising:
an electric power estimation circuit measuring an electric power of an amplified signal from the amplifier;
a comparator comparing the electric power of the amplified signal with a threshold; and
a gain setting circuit setting a gain of the amplifier$\pm\frac{1}{2}^i$ (i: integer, $1 \leq i \leq n$) in accordance with a comparison result of said comparator;
wherein the gain of the amplifier converged by the value i is incremented.

8. A radio communication system in which a communication frame including a preamble field and an information transfer field is transmitted from transmitter site communication equipment, and receiver site communication equipment receives the information transmitted in the information transfer field of the communication frame synchronously with a timing signal recovered from the preamble field, wherein the preamble field of the communication frame includes a first portion and a second portion succeeding the first portion, and wherein said receiver site communication equipment includes:
automatic gain control means for adjusting automatically the gain of a receiver amplifier in accordance with an electric power of the received signal in the first portion of the preamble field;
carrier recovering means for detecting both a frequency and a phase of a carrier of the received signal in the first portion of the preamble field, and recovering the carrier of the received signal using a local frequency synchronized with a frequency of the carrier;
clock producing means for recovering a timing signal from the received signal in the second portion of the preamble field and generating a clock signal having a symbol frequency with the timing signal thus recovered; and
means for receiving the information which has been transmitted in the information transfer field of the communication frame synchronously with the clock signal having the symbol frequency;

wherein said automatic gain control means comprising:
means for measuring an electric power of an amplified received signal from the receiver amplifier;
means for comparing the electric power of the amplified received signal with a threshold; and
means for setting a gain of the receiver amplifier$\pm\frac{1}{2}^i$ (i: integer, $1 \leq i \leq n$) in accordance with a comparison result of said means for comparing;
wherein the gain of the receiver amplifier converged by the value i is incremented.

9. Radio communication equipment including a transmission circuit and a reception circuit for communicating with other communication equipment through a communication frame having a predetermined format, wherein said transmission circuit includes:
preamble signal transmitting means for transmitting a carrier, which has been obtained from a local oscillator, with no modulation during a time period of a first portion of a preamble field of the communication frame and modulating the carrier with a symbol timing signal during a time period of a second portion which succeeds the first portion in the preamble field to transmit the modulated carrier; and information signal transmitting means for transmitting modulated transmission information from said preamble signal transmitting means with the modulated transmission information carried on the carrier during a time period of an information transfer field which is defined after the preamble field in the communication frame, and wherein said reception circuit includes:
automatic gain control means for setting automatically the gain of an amplifier for reception in accordance with an electric power of a received signal during a time period corresponding to the first portion of the preamble field of the received communication frame;
carrier recovering means for detecting both a frequency and a phase of a carrier of the received signal in the first portion of the preamble field and recovering the carrier of the received signal using a local frequency synchronized with a frequency of the carrier;
clock signal generating means for recovering a timing signal from the received signal during a time period corresponding to the second portion of the preamble field of the received frame and generating a clock signal having a symbol frequency synchronous with the timing signal; and
means for receiving the information, which has been transmitted from said other communication equipment, synchronously with the clock signal having the symbol frequency during a time period corresponding to the information transfer field of the received frame;

wherein said automatic gain control means comprising:
means for measuring an electric power of an amplified received signal from the amplifier;
means for comparing the electric power of the amplified received signal with a threshold; and
means for setting a gain of the amplifier$\pm\frac{1}{2}^i$ (i: integer, $1 \leq i \leq n$) in accordance with a result of comparison about the electric power;
wherein the gain of the amplifier converged by the value i is incremented.

10. A wireless communication method in a frequency hopped wireless communication system including a plurality of communication equipment in which each of said communication equipment changes a transmission/reception frequency in accordance with a predetermined hopping pattern synchronously with a timing in which a synchronous frame produced by one communication equipment as a control station is a reference, transmitter site communication equipment subjects, after modulating a carrier for a predetermined time period with a timing signal in a preamble field of a communication frame, the carrier to a quadrature amplitude modulation in an information transfer field in accordance with a transmission information signal, and receiver side communication equipment demodulates, after carrying out reception preparation with a received signal from the preamble field of a reception frame, the information signal from a quadrature amplitude modulated signal received in the information transfer field, wherein in said transmitter site communication equipment, the carrier for AGC control and a received frequency synchronization of a reception circuit in the receiver site communication equipment is transmitted during a first time period of the preamble field of the communication frame, and after the carrier is demodulated with a symbol timing signal during a second time period of the preamble field to be transmitted, transmission information is transmitted in the information transfer field of the communication frame, and wherein in said receiver site communication equipment, both the AGC control and synchronization of the received frequency of a receiver amplifier are completed during a time period required for receiving the signal from a carrier transmission field, a symbol timing is recovered during a time period required for receiving the signal from a timing signal modulation field, and operation of receiving the information signal in the information transfer field is carried out on a basis of a clock signal which is generated synchronously with the symbol timing;

wherein said AGC control comprising the steps of:
measuring an electric power of an amplified received signal from the receiver amplifier;
comparing the electric power of the amplified received signal with a threshold; and
setting a gain of the receiver amplifier$\pm\frac{1}{2}^i$ (i: integer, $1 \leq i \leq n$) in accordance with a result of comparison about the electric power;
wherein the gain of the receiver amplifier converged by the value i is incremented.

11. A wireless communication method according to claim 10, wherein a carrier frequency is hopped with a low hopping frequency so as to obtain a same transmission/reception frequency during one communication frame time period by each of the communication equipment.

12. Radio communication equipment for communicating with other communication equipment through a communication frame including a preamble field and an information transfer field succeeding the preamble field, comprising:

an automatic gain control circuit for controlling automatically a gain of an amplifier for amplifying a received signal in accordance with an electric power of a received signal;
a frequency mixing circuit for mixing an amplified signal with a local frequency;
a carrier synchronous circuit for detecting both a frequency and a phase of a carrier of the received signal in an output signal from said frequency mixing circuit, and synchronizing the local frequency with the frequency of the carrier;
a timing recovery circuit for recovering a symbol timing signal from an output signal from the carrier synchronous circuit; and
a signal demodulation circuit for demodulating the information transfer field of the output signal on a basis of a clock signal synchronous with the symbol timing signal which has been recovered in said timing recovery circuit;

wherein said automatic gain control circuit comprising:
an electric power estimation circuit measuring an electric power of the amplified signal from the amplifier;
a comparator comparing the electric power of the amplified signal with a threshold; and
a gain setting circuit setting the gain of the amplifier$\pm\frac{1}{2}^i$ (i: integer, $1 \leq i \leq n$) in accordance with a result of comparison of said comparator;
wherein the gain of the amplifier converged by the value i is incremented.

13. Radio communication equipment according to claim 12, wherein said automatic gain control circuit controls the gain of the amplifier in accordance with the electric power of the received signal which has been detected in a first portion of the preamble field.

14. Radio communication equipment according to claim 13, wherein both the frequency and the phase of carrier are detected in a second portion succeeding the first portion of the preamble field by said carrier synchronous circuit, and the symbol timing signal is recovered from a third portion succeeding the second portion of the preamble field by said timing recovery circuit.

* * * * *